(12) United States Patent
Nakagawa

(10) Patent No.: US 10,797,912 B2
(45) Date of Patent: Oct. 6, 2020

(54) RELAY DEVICE AND RELAY METHOD

(71) Applicant: FUJITSU LIMITED, Kawasaki-shi, Kanagawa (JP)

(72) Inventor: Go Nakagawa, Saitama (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 16/171,492

(22) Filed: Oct. 26, 2018

(65) Prior Publication Data

US 2019/0149359 A1 May 16, 2019

(30) Foreign Application Priority Data

Nov. 16, 2017 (JP) ................................. 2017-221292

(51) Int. Cl.
| | | |
|---|---|---|
| *H04L 12/66* | (2006.01) | |
| *H04L 12/709* | (2013.01) | |
| *H04L 12/935* | (2013.01) | |
| *H04L 12/947* | (2013.01) | |
| *H04L 12/803* | (2013.01) | |
| *H04L 12/891* | (2013.01) | |

(52) U.S. Cl.
CPC ............ *H04L 12/66* (2013.01); *H04L 45/245* (2013.01); *H04L 47/125* (2013.01); *H04L 47/41* (2013.01); *H04L 49/25* (2013.01); *H04L 49/30* (2013.01)

(58) Field of Classification Search
CPC ....... H04L 12/66; H04L 45/245; H04L 47/41; H04L 47/125; H04L 49/25; H04L 49/30
See application file for complete search history.

(56) References Cited

U.S. PATENT DOCUMENTS

2011/0211585 A1* 9/2011 Kodaka ................... H04L 45/00
370/401

FOREIGN PATENT DOCUMENTS

| JP | 2011-199834 | 10/2011 |
| JP | 2014-112977 | 6/2014 |

\* cited by examiner

*Primary Examiner* — Melvin C Marcelo
*Assistant Examiner* — Natali Pascual Peguero
(74) *Attorney, Agent, or Firm* — Fujitsu Patent Center

(57) ABSTRACT

A relay device includes one or more memories, and one or more processors configured to, based on an amount of traffic regarding each of a plurality of ports included in a plurality of relay devices including the relay device belonging to an MLAG, determine whether a total amount of traffic in the MLAG is no more than a first threshold, in a case where the total amount of traffic in the MLAG is no more than the first threshold, select a first port from among the plurality of ports in accordance with the amount of traffic regarding each of the plurality of ports, and turn off the first port in a case where the first port is included in the relay device.

13 Claims, 28 Drawing Sheets

FIG. 2

| LAGID | | | | | | |
|---|---|---|---|---|---|---|
| SWID | PID | SWID | PID | ... | SWID | PID |
| AMOUNT OF TRAFFIC | | AMOUNT OF TRAFFIC | | ... | AMOUNT OF TRAFFIC | |
| POWER SUPPLY INFORMATION | | POWER SUPPLY INFORMATION | | ... | POWER SUPPLY INFORMATION | |
| CONNECTION DESTINATION | | CONNECTION DESTINATION | | ... | CONNECTION DESTINATION | |
| OFF THRESHOLD | | | | | | |
| ON THRESHOLD | | | | | | |

FIG. 4

| PORT POWER STATE IN MLAG *1 | | | | WHETHER SWITCH MAY BE TURNED OFF |
|---|---|---|---|---|
| SWITCH A-PORT #1 | SWITCH A-PORT #2 | SWITCH B-PORT #1 | SWITCH C-PORT #1 | |
| ○ | ○ | ○ | ○ | × |
| ○ | ○ | ○ | × | × |
| ○ | ○ | × | ○ | × |
| ○ | ○ | × | × | ○ |
| ○ | × | ○ | ○ | × |
| ○ | × | ○ | × | ○*2 |
| ○ | × | × | ○ | ○*2 |
| ○ | × | × | × | ○ |
| × | ○ | ○ | ○ | × |
| × | ○ | ○ | × | ○*2 |
| × | ○ | × | ○ | ○*2 |
| × | ○ | × | × | ○ |
| × | × | ○ | ○ | ○ |
| × | × | ○ | × | ○ |
| × | × | × | ○ | ○ |
| × | × | × | × | ○ |

*1 ○ = 2 POWER ON STATE,  × = POWER OFF STATE
*2 IT IS POSSIBLE TO TURN OFF SWITCH BY BRINGING POWER OFF PORT TO ONE SWITCH

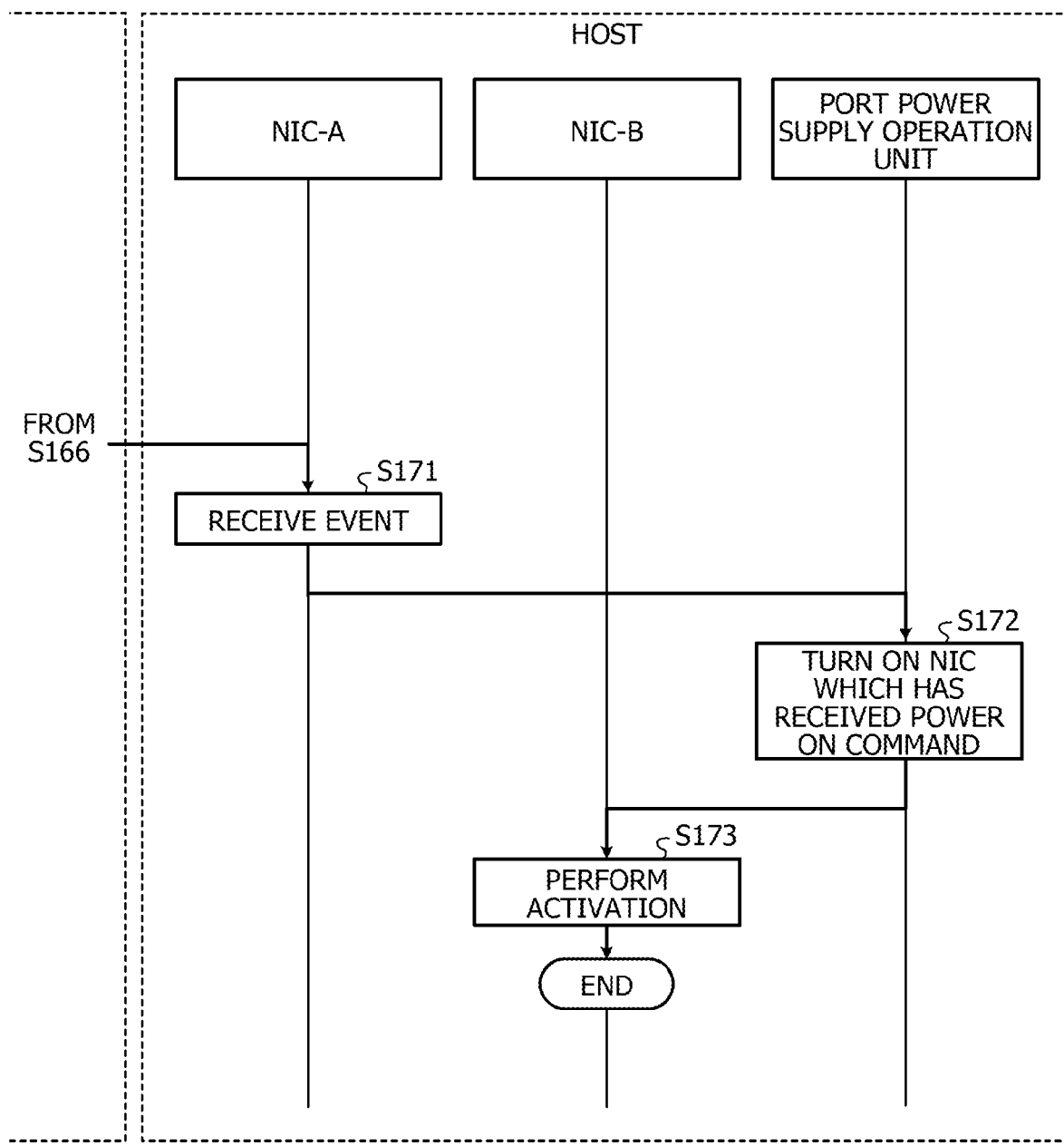

RELAY DEVICE AND RELAY METHOD

CROSS-REFERENCE TO RELATED APPLICATION

This application is based upon and claims the benefit of priority of the prior Japanese Patent Application No. 2017-221292, filed on Nov. 16, 2017, the entire contents of which are incorporated herein by reference.

FIELD

The embodiments discussed herein are related to a relay technology.

BACKGROUND

Link aggregation group (LAG) technology enables to handle a plurality of physical links as one line by bundling a plurality of physical links, so that the plurality of physical links may be simultaneously used at the time of communication, thereby improving a communication speed and fault tolerance.

In multi-chassis link aggregation (MLAG) technology, the link aggregation may be applied to physical links across multiple switches. Configuration of the link aggregation with two chassis using the MLAG makes it possible to increase the redundancy of the physical links and the switch, and at the same time increase the bandwidth.

FIG. 16 is a diagram for explaining an LAG and an MLAG. In FIG. 16, the hosts represented by a host A and a host B are information processing apparatuses that perform information processing. The host has a network interface card (NIC) and performs communication using the NIC. The switches represented by a switch A and a switch B are relay devices that relay communication. The switch has a port, and performs transmission and reception of a packet using a port.

In FIG. 16, an LAG is assembled between the switch A and the switch B. An MLAG is assembled between the host A, the switch A and the switch B, and an MLAG is assembled between the host B, the switch A and the switch B.

By making each physical link redundant with two or more switches using the MLAG, even when a failure occurs in a specific port on the switch or a switch main body, it is possible to avoid the communication from being interrupted by switching the route to the other physical links that form redundancy.

In a packet relay device including a plurality of LAGs connected to a plurality of redundant network interface sections, there is a technique to control the standby power of the standby network interface section. In this technique, the packet relay device determines a stand-by port section in the LAG, and determines the presence or absence of the port section under operation belonging to each redundant network interface section. In a case where there is no port section under operation in the network interface section, the packet relay device changes the network interface section to be held on standby. For example, the related art is disclosed in Japanese Laid-open Patent Publication No. 2011-199834.

SUMMARY

According to an aspect of the embodiments, a relay device includes one or more memories, and one or more processors configured to, based on an amount of traffic regarding each of a plurality of ports included in a plurality of relay devices including the relay device belonging to an MLAG, determine whether a total amount of traffic in the MLAG is no more than a first threshold, in a case where the total amount of traffic in the MLAG is no more than the first threshold, select a first port from among the plurality of ports in accordance with the amount of traffic regarding each of the plurality of ports, and turn off the first port in a case where the first port is included in the relay device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of port management information;

FIG. 4 is a diagram illustrating a pattern on whether the switch may be turned OFF in an MLAG;

FIGS. 14A to 14C are diagrams illustrating a sequence of a process of restoring the port;

DESCRIPTION OF EMBODIMENTS

In an MLAG, when traffic is heavy, redundant ports and switches are usefully used for load balancing. However, redundant ports and switches may not be usefully utilized when traffic is light. Therefore, in the related art, in a case where the traffic is light, any one of the redundant physical links is unnecessary. Despite this fact, all ports and switches are turned ON. Thus, there is a problem in that unnecessary power is consumed.

Hereinafter, embodiments of a relay device and a program disclosed herein will be described in detail with reference to the drawings. The embodiments do not limit the disclosed technique. In the description below, the physical link is simply referred to as a link.

Figure 1:
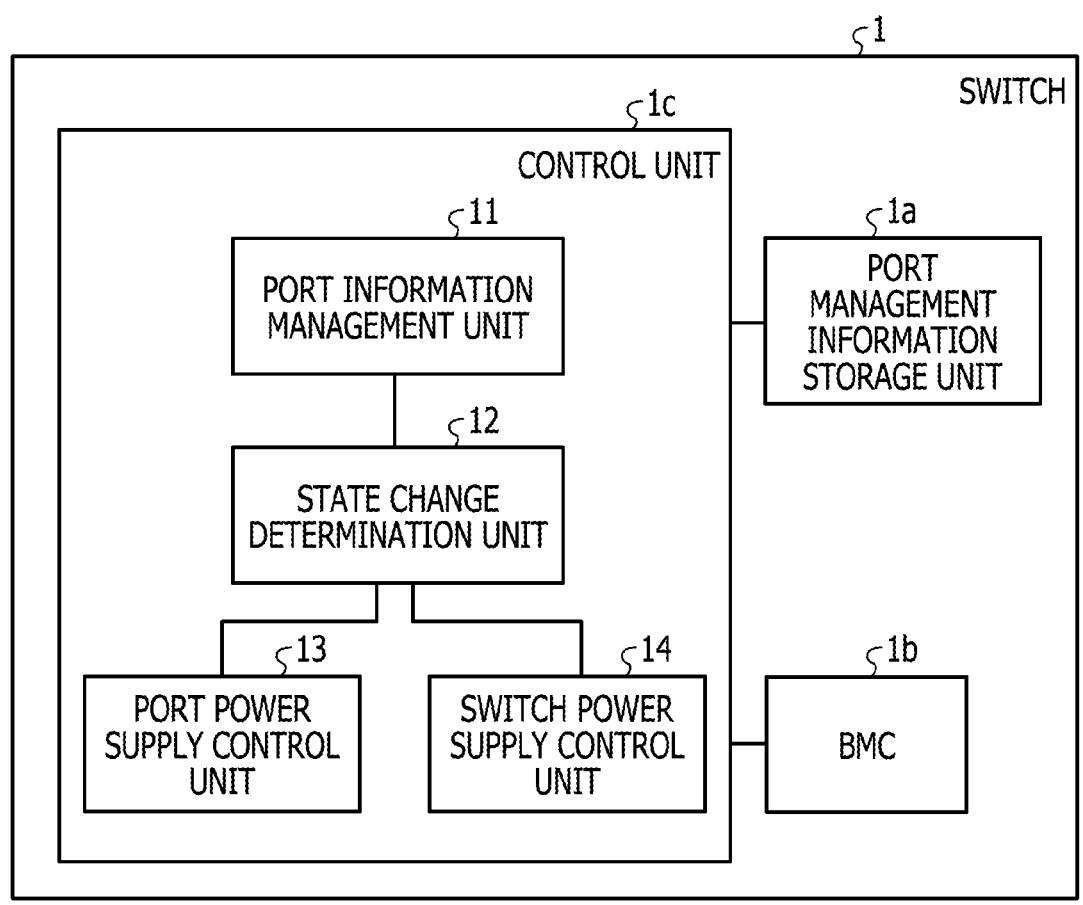
FIG. 1 is a diagram illustrating a functional configuration of a switch according to an embodiment.

First, the functional configuration of a switch according to the embodiment will be described. FIG. 1 is a diagram illustrating a functional configuration of a switch according to an embodiment. As illustrated in FIG. 1, a switch 1 according to the embodiment includes a port management information storage unit 1a, a baseboard management controller (BMC) 1b, and a control unit 1c.

The port management information storage unit 1a stores port management information that is information for managing ports. FIG. 2 is a diagram illustrating an example of port management information. As illustrated in FIG. 2, the port management information includes an LAGID, an SWID with respect to the number of ports included in an LAG or an MLAG, a PID, an amount of traffic, power supply information, a connection destination, an OFF threshold, and an ON threshold. The port management information storage unit 1a stores port management information for each LAG or MLAG.

The LAGID is an identifier for identifying the LAG or the MLAG. The SWID is an identifier for identifying the switch 1 of the port included in the LAG or the MLAG, and the PID is an identifier for identifying the port. The amount of traffic is an amount of traffic of the port. The power supply information indicates whether the port is turned ON or OFF. The connection destination is a media access control (MAC) address of the NIC of the device to which the port is connected. The OFF threshold is a threshold used when the port is turned OFF. The ON threshold is a threshold used when the port is turned ON.

A BMC 1b is a control device that operates also when the switch 1 is turned OFF. The BMC 1b is connected to the BMCs 1b of the other switches 1 via a management local area network (LAN), and communicates with the BMCs 1b of the other switches 1. When the switch function of the own device stops, the BMC 1b transmits a switch stop notification signal to the other switches 1. When the BMC 1b receives switch stop notification signals from the other switches 1 while the own device is turned OFF, the BMC 1b turns ON the own device.

The BMC 1b transmits a Keep-Alive packet to the other switches 1 and also monitors Keep-Alive packets transmitted from the other switches 1. The Keep-Alive is communication performed periodically to validate that the connection is effective. When the Keep-Alive from the active switch 1 is interrupted while the own device is turned OFF, the BMC 1b turns ON the own device. Active means "in an available state".

The control unit 1c controls the power of the port and the switch 1 by using the port management information. The control unit 1c includes a port information management unit 11, a state change determination unit 12, a port power supply control unit 13, and a switch power supply control unit 14.

The port information management unit 11 monitors a state of power supply of each port of the own device, and when the power supply is turned ON, the port information management unit 11 updates the power supply information of the port management information. The port information management unit 11 monitors the amount of traffic of each port of the own device, and exchanges the amount of traffic with the other switches 1 using the BMC 1b. The port information management unit 11 stores the amount of monitored traffic and the amount of traffic received from the other switches 1 in the port management information storage unit 1a.

The port information management unit 11 detects that the amount of traffic in the MLAG has become equal to or less than the OFF threshold, or become equal to or more than the ON threshold, in a case where the own device is a master switch 1. The master switch 1 is a switch 1 that decides to change the OFF and ON state of the power supply of the port and the switch 1 among the switches 1 with which the MLAG is assembled.

When updating the power supply information in the port management information storage unit 1a, the port information management unit 11 transmits the port management information to the other switches 1 by using the BMC 1b. Upon receiving the port management information from the other switches 1 using the BMC 1b, the port information management unit 11 updates the port management information storage unit 1a. When the link of the port which is turned ON becomes active, the port information management unit 11 notifies the master switch 1 that the link has become active.

The state change determination unit 12 operates when the own device is the master switch 1. The state change determination unit 12 decides to turn OFF the port having the smallest amount of traffic in the MLAG whose amount of traffic is equal to or less than the OFF threshold. The state change determination unit 12 instructs the port information management unit 11 to update the port management information storage unit 1a based on the information of the port to be turned OFF to perform control so as to turn OFF the port which has been determined to be turned OFF.

The state change determination unit 12 determines that one of the ports which are turned OFF in the MLAG whose amount of traffic is equal to or more than the ON threshold is turned ON. In a case where there is a plurality of ports which is turned OFF in the MLAG whose amount of traffic is equal to or more than the ON threshold, the state change determination unit 12 determines that, for example, the port with the lowest number in the switch 1 having the largest number of the ports that are turned OFF is set to be a port to be turned ON. The state change determination unit 12 instructs the port information management unit 11 to update the port management information storage unit 1a based on the information of the port to be turned ON to performs control so as to turn ON the port which has been determined to be turned ON.

In a case where the port which is turned OFF in the MLAG whose amount of traffic is equal to or more than the ON threshold is not in the power ON switch 1, the state change determination unit 12 determines the switch 1 to be turned ON among the switches 1 in the MLAG. The state change determination unit 12 instructs the port information management unit 11 to update the port management information storage unit 1a based on the information of the switch 1 to be turned ON.

The state change determination unit 12 determines the switch 1 to be turned OFF in a case where all MLAGs excluding the inter-switch link satisfy the possible condition of switch power supply OFF.

When the MLAG is assembled with two switches 1, the possible condition of switch power supply OFF means that a half or more of the ports belonging to the MLAG are turned OFF. When the MLAG is assembled with three switches 1, the possible condition of switch power supply OFF means that one third or more of the ports belonging to the MLAG are turned OFF. When the MLAG is assembled with n switches 1 (n is a positive integer), the possible condition of switch power supply OFF means that 1/n or more of the ports belonging to the MLAG are turned OFF.

Figure 3:
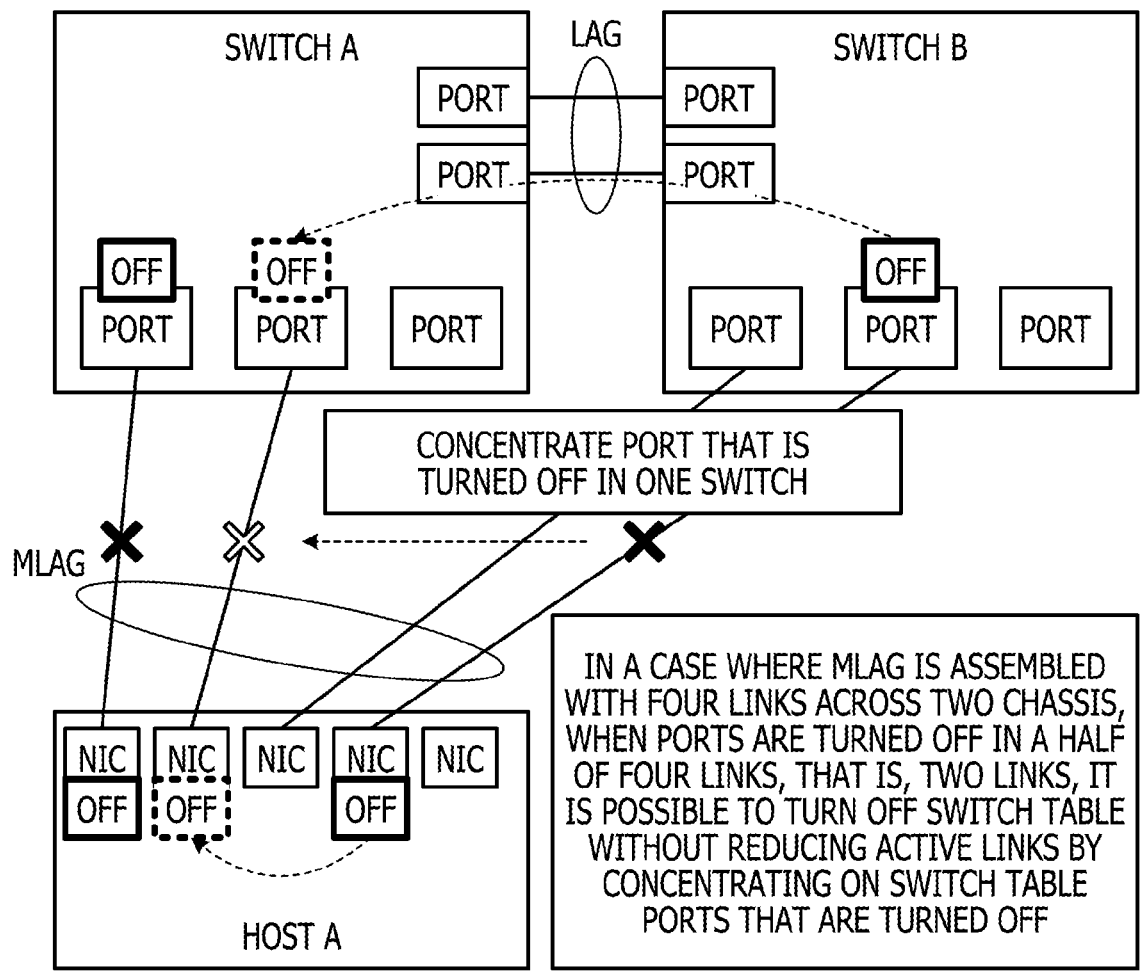
FIG. 3 is a diagram for explaining the possible condition (2 chassis 4 links) of switch power supply OFF in an MLAG.

FIG. 3 is a diagram for explaining the possible condition (2 chassis 4 links) of switch power supply OFF in an MLAG. In FIG. 3, the MLAG is assembled with four links across two chassis (switch 1). In this case, in a case where ports are turned OFF in a half or more of the four links, that is, two or more links, one switch 1 may be turned OFF without reducing active links by concentrating the ports that are turned OFF into one switch 1.

FIG. 4 is a diagram illustrating a pattern on whether the switch may be turned OFF in an MLAG. FIG. 4 illustrates whether the switch may be turned OFF for all combinations of power states of the respective ports. The state of power supply of each port is denoted by "○" (ON state) or "×" (OFF state). Whether the switch may be turned OFF is denoted by "○" (possible) or "×" (impossible). As illustrated in FIG. 4, in a case where the MLAG is assembled with four links across two switches 1, when two or more ports are turned OFF, it is possible to turn OFF one switch 1. In a case where two ports with power ON are arranged in two switches 1, it is possible to turn OFF one switch 1 by concentrating the two ports that are turned ON to any one of the switches 1.

Figure 5:
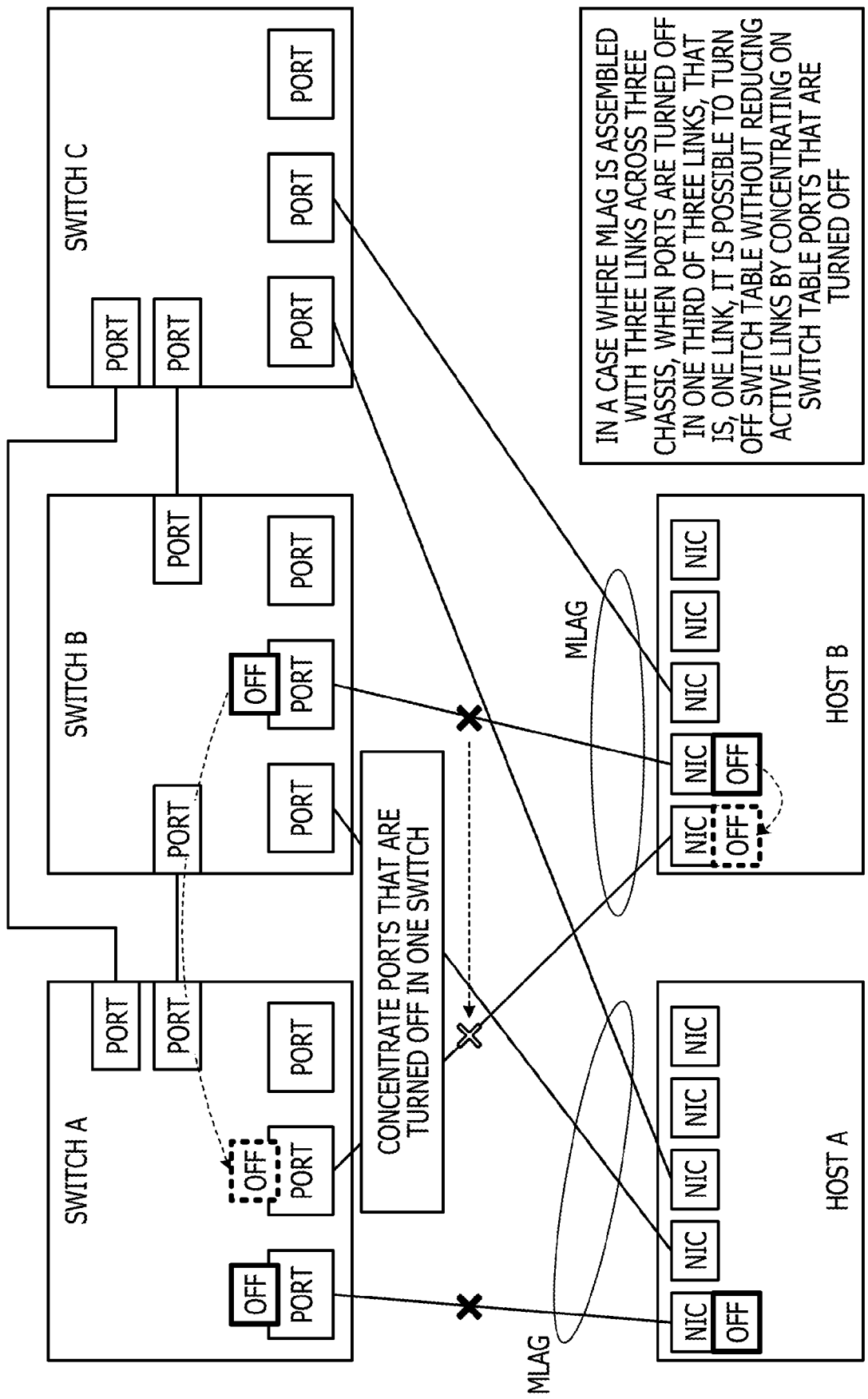
FIG. 5 is a diagram for explaining the possible condition (3 chassis 3 links) of switch power supply OFF in an MLAG.

FIG. 5 is a diagram for explaining the possible condition (3 chassis 3 links) of switch power supply OFF in an MLAG. In FIG. 5, the MLAG is assembled with three links across three chassis. In this case, in a case where the ports are turned OFF in one third or more of the three links, that is, one or more links, one switch 1 may be turned OFF without reducing active links by concentrating the ports that are turned OFF into one switch 1.

Returning to FIG. 1, the state change determination unit 12 determines, for example, the switch 1 having the largest number of ports which are turned OFF, or the switch 1 having the smallest SWID as the switch 1 to be turned OFF. When the switch 1 to be turned OFF is the own device, the state change determination unit 12 delegates the master authority to another switch 1.

The state change determination unit 12 identifies the host side NIC corresponding to the restored port based on the port management information, and performs control so as to turn ON the identified NIC. For example, with respect to the NIC to which the restored port is connected, the state change determination unit 12 transmits, to the host having the connection NIC through the active link, a packet instructing to turn ON the connection NIC.

The port power supply control unit 13 controls the power supply of the port. The port power supply control unit 13 transmits a power OFF command packet to the NIC of the host to which the port whose power supply information with respect to the port management information is changed from ON to OFF is connected, and instructs to turn OFF the port of the NIC. The port power supply control unit 13 turns OFF the port whose power supply information with respect to the port management information is changed from ON to OFF.

The port power supply control unit 13 turns ON the port whose power supply information with respect to the port management information is changed from OFF to ON.

The switch power supply control unit 14 controls the power supply of the switch 1. When the state change determination unit 12 determines that the power is turned OFF, the switch power supply control unit 14 turns OFF the switch 1.

Figure 6:
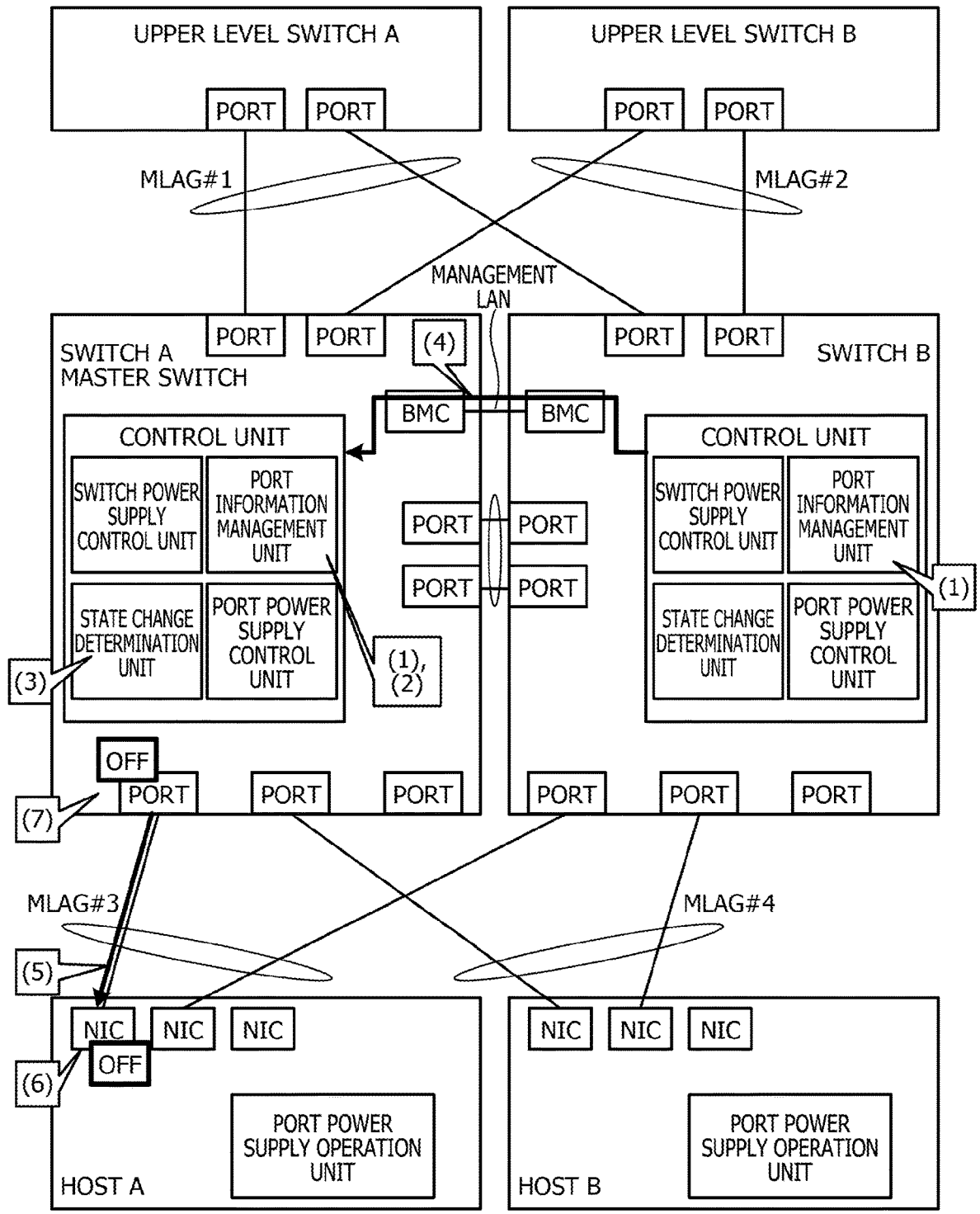
FIG. 6 is a diagram for explaining a procedure of port power OFF.

Next, the procedure of power control of the ports and the switches 1 will be described with reference to FIGS. 6 to 8. FIG. 6 is a diagram for explaining a procedure of port power OFF. FIG. 6 illustrates a case where a switch A is the master switch 1. As illustrated in FIG. 6, the port information management unit 11 of respective switches 1 monitors the amount of traffic of each port, updates the port management information, and shares the amount of traffic of all ports between switches 1 (1).

The port information management unit 11 of the master switch 1 detects the MLAG whose amount of traffic has become equal to or less than the OFF threshold (2). The state change determination unit 12 of the master switch 1 determines the port having the smallest amount of traffic in the MLAG whose amount of traffic is equal to or less than the OFF threshold as the port to be turned OFF (3).

Based on the determination of the state change determination unit 12, the port information management unit 11 of the master switch 1 updates the port management information, and transmits the updated port management information to the other switches 1 (4). The port power supply control unit 13 of the switch 1 having the port whose power has been updated from ON to OFF in the port management information transmits a power OFF command packet to the NIC of the host to which the updated port is connected, and instructs to turn OFF the port of the NIC (5). In a case where the connection destination is an upper level switch 1, the port power supply control unit 13 does not transmit the power OFF command packet, and the power of the connection port is remained.

The host that has received the power OFF command packet turns OFF the NIC that has received the power OFF command packet (6). The port power supply control unit 13 that has transmitted the power OFF command packet turns OFF the port that has transmitted the power OFF command packet (7).

Figure 7A:
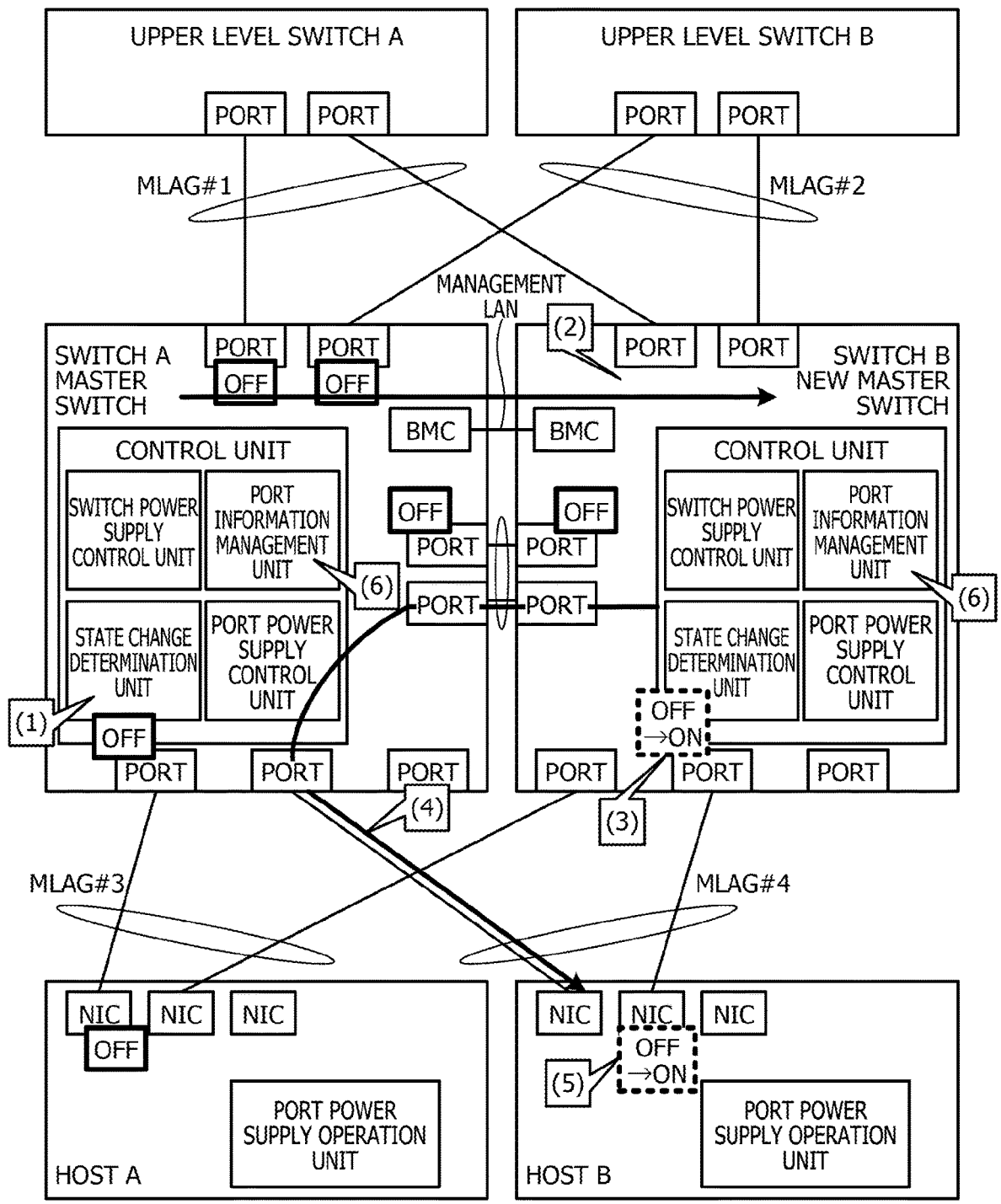
FIG. 7A is a first diagram for explaining a procedure of the switch power supply OFF.
Figure 7B:
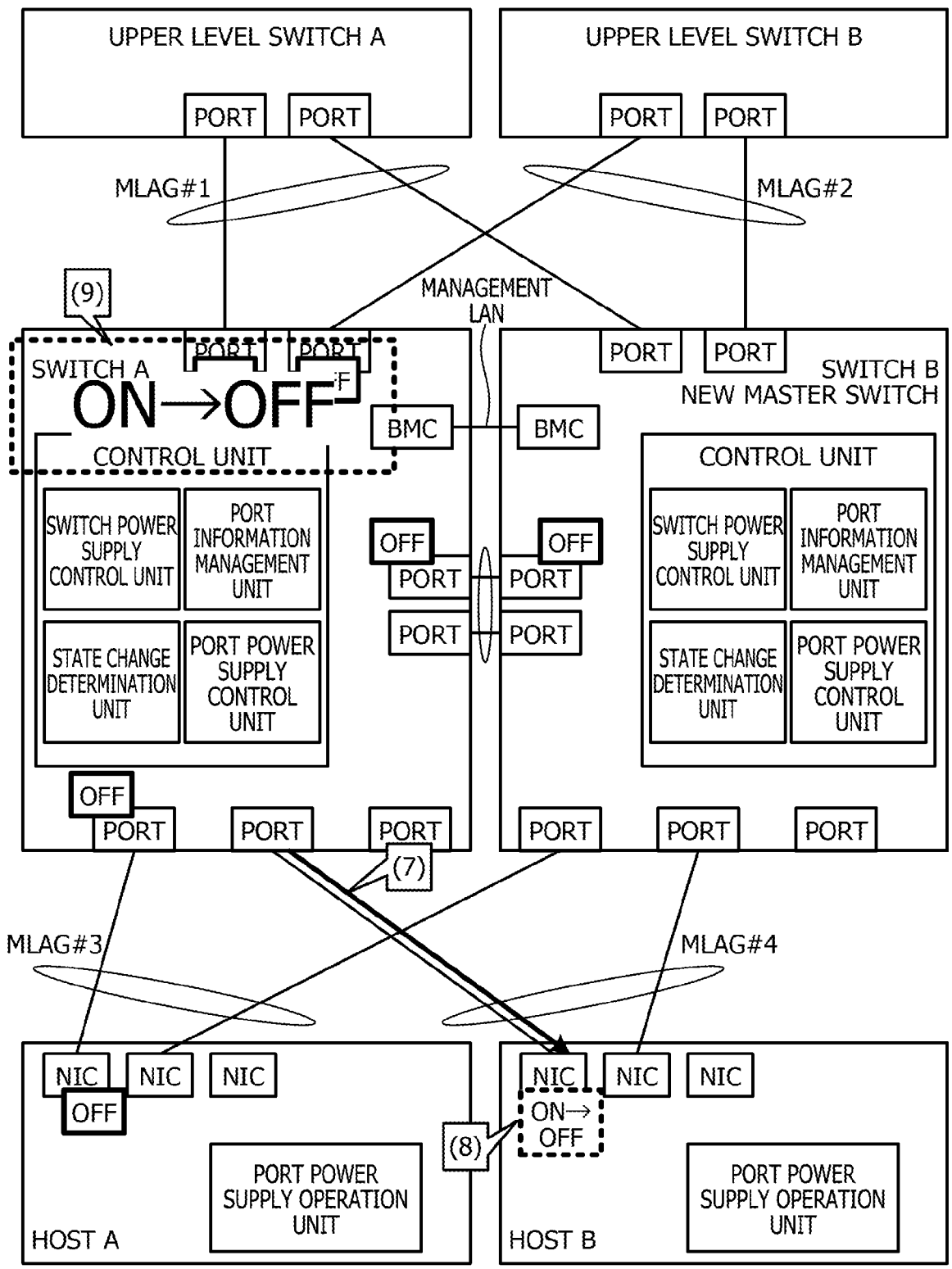
FIG. 7B is a second diagram for explaining a procedure of the switch power supply OFF.

FIGS. 7A and 7B are diagrams for explaining a procedure of the switch power supply OFF. FIG. 7A illustrates a case where the master switch 1 is switched from the switch A to a switch B. The ports whose traffic has lowered are sequentially turned OFF. In a case where the possible condition of switch power supply OFF is satisfied with respect to all MLAGs excluding the inter-switch link, as illustrated in FIG. 7A, the state change determination unit 12 of the master switch 1 determines the switch 1 to be turned OFF (1). In FIG. 7A, the switch A is the master switch 1, and is also the switch 1 to be turned OFF.

In a case where the switch 1 to be turned OFF is the master switch 1, the state change determination unit 12 of the master switch 1 delegates the master authority to another switch 1 (2). The port power supply control unit 13 of the other switches 1 turns ON the port of the other switches 1 which is turned OFF in the MLAG to which the active port of the switch 1 to be turned OFF belongs (3).

The state change determination unit 12 transmits to the host to which the port with the power on is connected a power ON command packet instructing to turn ON the port of the NIC to be recovered via the active link (active link in the same MLAG) (4). The host that has received the power ON command packet turns ON the instructed port of the NIC (5).

The port information management unit 11 of the switch 1 having the port which is turned ON validates that the link of the port which has been turned ON has become active, and notifies the master switch 1 that the link of the port has become active (6). In FIG. 7A, the switch 1 having the port turned ON is the same as the master switch 1.

As illustrated in FIG. 7B, the port power supply control unit 13 of the switch 1 to be turned OFF transmits a power OFF command packet to the connection NIC from the active port of the switch 1 to be turned OFF, and instructs to turn OFF the port (7). The host turns OFF the port that has received the power OFF command packet (8). The switch power supply control unit 14 of the switch 1 to be turned OFF keeps operable only the BMC 1b that monitors the Keep-Alive so that the switch power supply control unit 14 recognizes that the active switch 1 has gone down when the active switch 1 has gone down to restore the active switch 1, and turn OFF the switch 1 (9).

Figure 8:
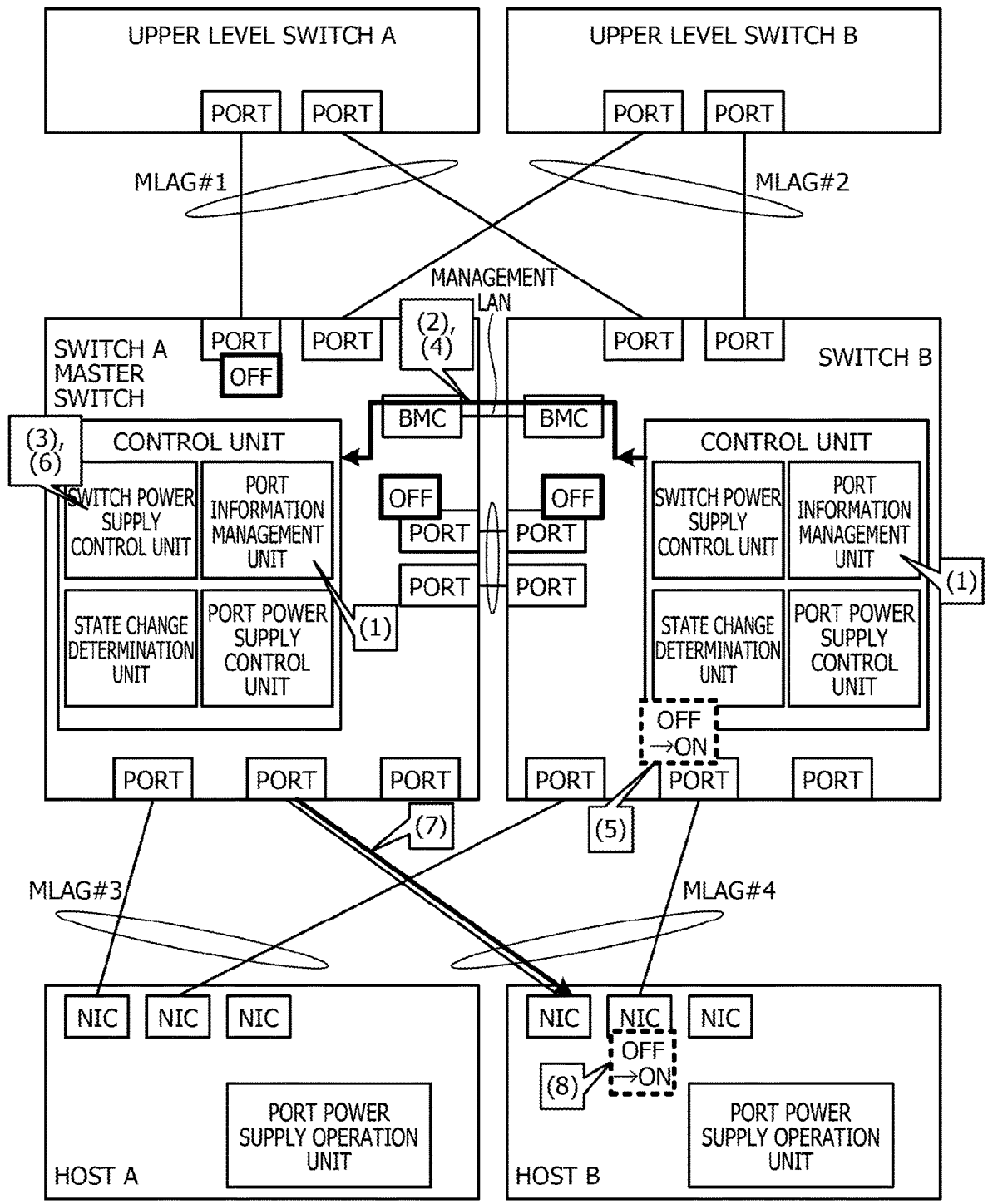
FIG. 8 is a diagram for explaining a procedure of port restoration.

FIG. 8 is a diagram for explaining a procedure of port restoration. As illustrated in FIG. 8, the port information management unit 11 of respective switches 1 monitors the amount of traffic of each port, updates the port management information, and shares the amount of traffic of all ports between switches 1 (1).

The port information management unit 11 of the master switch 1 detects the MLAG whose amount of traffic has become equal to or more than the ON threshold (2). The state change determination unit 12 of the master switch 1 determines the port to be turned ON from among the ports which are turned OFF in the MLAG whose amount of traffic has become equal to or more than the ON threshold (3).

Based on the determination of the state change determination unit 12, the port information management unit 11 of the master switch 1 updates the port management information, and transmits the updated port management information to the other switches 1 (4). The port power supply control unit 13 of the switch 1 having the port whose power has been updated from OFF to ON in the port management information turns ON the port (5).

The state change determination unit 12 of the master switch 1 identifies the host side NIC corresponding to the port which has been turned ON based on the port management information (6). The state change determination unit 12 of the master switch 1 transmits to the host a power ON command packet instructing to turn ON the port of the NIC to be recovered via the active link (active link in the same MLAG and so forth) (7). The host that has received the power ON command packet turns ON the instructed port of the NIC (8).

When the traffic increases, the switch 1 with which the MLAG is assembled performs the switch restoration in the following procedure. The port information management unit 11 of respective switches 1 monitors the amount of traffic of each port, updates the port management information, and shares the amount of traffic of all ports between switches 1.

The port information management unit 11 of the master switch 1 detects the MLAG whose amount of traffic has become equal to or more than the ON threshold. The state change determination unit 12 of the master switch 1 determines the switch 1 to be turned ON.

The port information management unit 11 of the master switch 1 transmits a magic packet to the switch 1 to be turned ON via a management LAN. The BMC 1b of the switch 1 that has received the magic packet turns ON the switch 1. The switch 1 which is turned ON performs port restoration described in (3) and the subsequent procedure in FIG. 8.

In a case where the switch function is stopped due to a partial failure of the active switch 1 and the BMC 1b is functioning, the switch 1 with which the MLAG is assembled performs switch restoration in the following procedure. When the switch function of the active switch 1 is stopped, the BMC 1b of the active switch 1 transmits a switch stop notification signal to the BMC 1b of the switch 1 which is turned OFF.

The BMC 1b that has received the switch stop notification signal turns ON the own device. The port power supply control unit 13 of the switch 1 which is turned ON turns ON all ports. The master switch 1 is determined among the active switches 1.

When the link layer discovery protocol (LLDP) packet is interrupted, the host turns ON the other ports in the MLAG where the LLDP packet is interrupted. The LLDP is a protocol used for collecting device information. The switch 1 which is turned ON waits for link establishment and turns OFF the port where link establishment has not been performed within a certain period.

In a case where the function of the BMC 1b as well as the function of the switch stop due to the stop of the active switch 1, the switch 1 with which the MLAG is assembled performs switch restoration in the following procedure. The BMC 1b of the switch 1 which is turned OFF monitors the Keep-Alive from the active switch 1, and turns ON the own device when the Keep-Alive is interrupted. The port power supply control unit 13 of the switch 1 which is turned ON turns ON all ports. The master switch 1 is determined among the active switches 1.

When the LLDP packet is interrupted, the host turns ON the other ports in the MLAG where the LLDP is interrupted. The switch 1 which is turned ON waits for link establishment and turns OFF the port where link establishment has not been performed within a certain period.

Figure 9A:
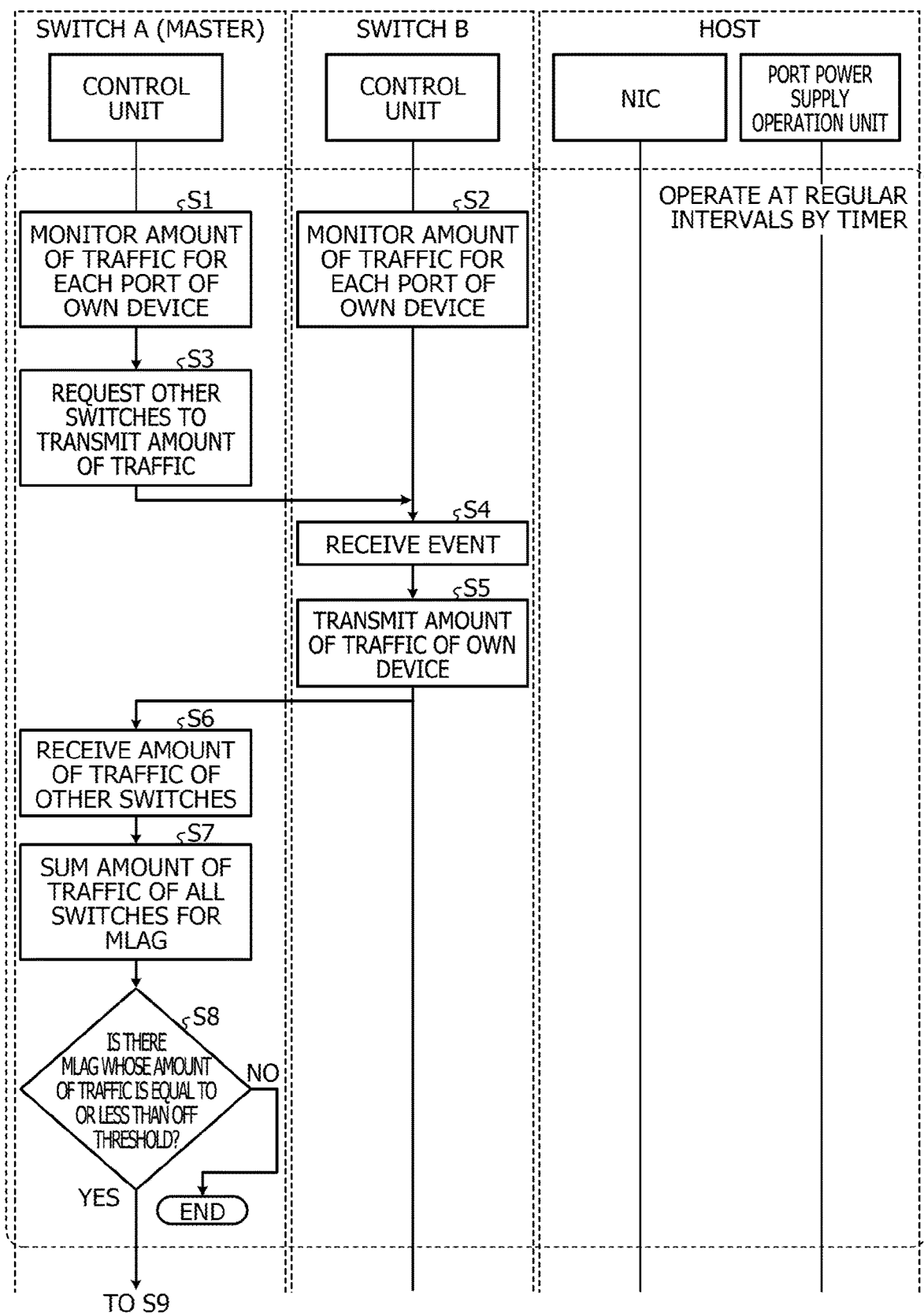
FIGS. 9A and 9B are diagrams illustrating a sequence of a process of turning OFF the port.
Figure 9B:
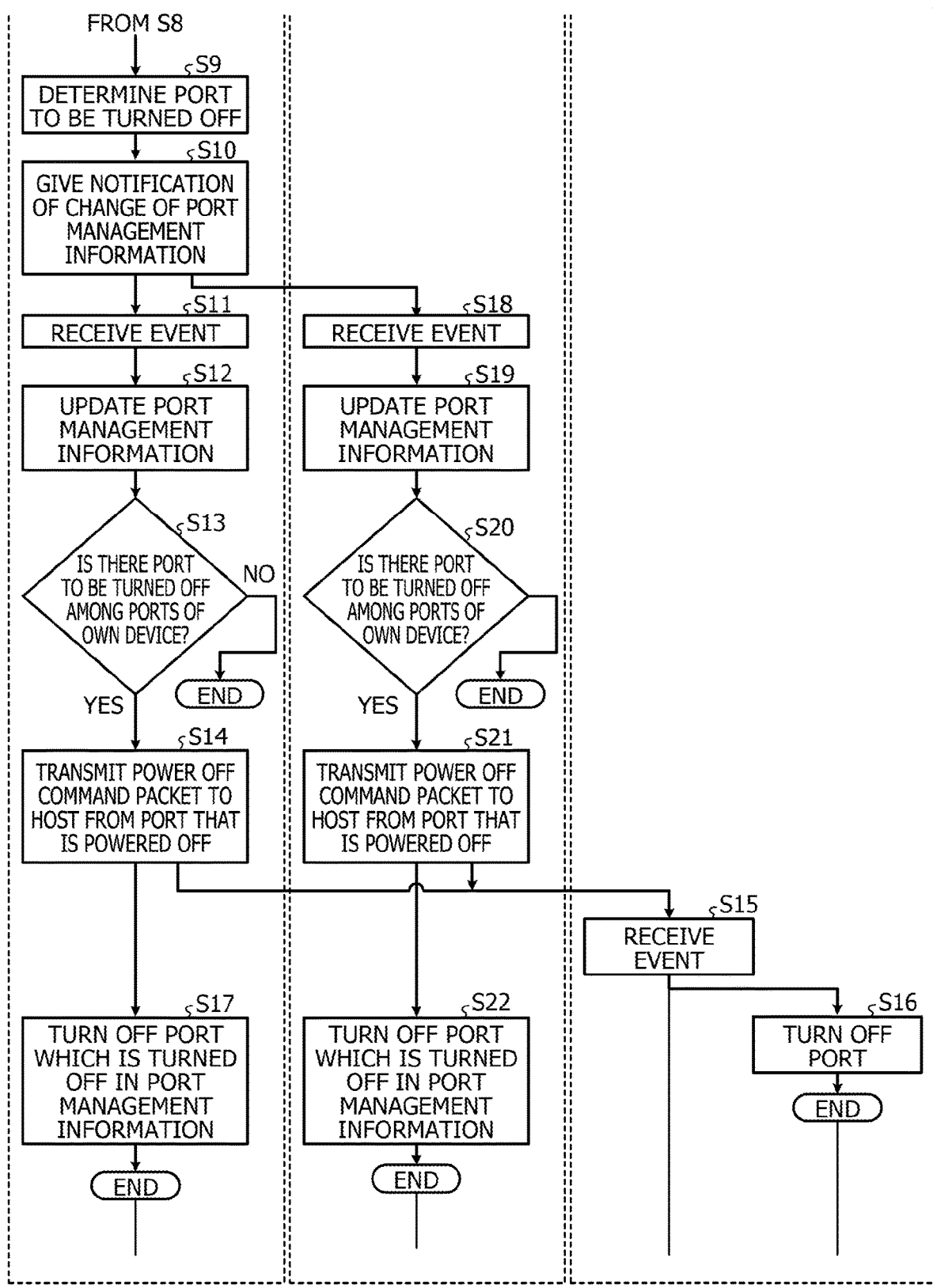

Next, the sequence of processing for turning OFF the port will be described. FIGS. 9A and 9B are diagrams illustrating a sequence of a process of turning OFF the port. FIGS. 9A and 9B illustrate a case where the switch A is the master switch 1.

As illustrated in FIGS. 9A and 9B, the control unit 1c of the switch A monitors the amount of traffic of each port of the own device (step S1). The control unit 1c of the switch B monitors the amount of traffic of each port of the own device (step S2). The control unit 1c of the switch A requests the other switches 1 to transmit the amount of traffic (step S3).

The control unit 1c of the switch B receives an event requesting the transmission of the amount of traffic (step S4), and transmits the amount of traffic of the own device to the switch A (step S5). The control unit 1c of the switch A receives the amount of traffic of the other switches 1 (step S6), and the amount of traffic of all the switches 1 is summed for each MLAG (step S7).

The control unit 1c of the switch A determines whether there is an MLAG whose amount of traffic is equal to or less than the OFF threshold (step S8). If there is no MLAG, the process is terminated. On the other hand, in a case where there is an MLAG whose amount of traffic is equal to or less than the OFF threshold, the control unit 1c of the switch A determines the port to be turned OFF (step S9), and notifies the own device and the other switches 1 of the change of port management information (step S10).

When an event giving a notification of the change of the port management information is received (step S11), the control unit 1c of the switch A updates the port management information (step S12), and determines whether there is a port to be turned OFF among the ports of the own device (step S13). In a case where there is no port to be turned OFF among the ports of the own device, the control unit 1c of the switch A terminates the process.

On the other hand, in a case where there is a port to be turned OFF among the ports of the own device, the control unit 1c of the switch A transmits a power OFF command packet to the host from the port to be turned OFF (step S14). The NIC of the host receives the event with respect to the power OFF command packet (step S15), and a port power supply operation unit of the host turns OFF the port (step S16). The control unit 1c of the switch A turns OFF the port which has been turned OFF due to the port management information (step S17).

Upon receiving an event giving a notification of the change of the port management information (step S18), the control unit 1c of the switch B updates the port management information (step S19), and determines whether there is a port to be turned OFF among the ports of the own device (step S20). In a case where there is no port to be turned OFF among the ports of the own device, the control unit 1c of the switch B terminates the process.

On the other hand, in a case where there is a port to be turned OFF among the ports of the own device, the control unit 1c of the switch B transmits a power OFF command packet to the host from the port to be turned OFF (step S21). The NIC of the host receives the event with respect to the power OFF command packet (step S15), and a port power supply operation unit of the host turns OFF the port (step S16). The control unit 1c of the switch B turns OFF the port which has been turned OFF due to the port management information (step S22).

In this way, in a case where there is an MLAG whose amount of traffic is equal to or less than the OFF threshold, the master switch 1 determines the port to be turned OFF. A switch 1 having a port to be turned OFF transmits a power OFF command packet to the host, and turns OFF the port. Therefore, the switch 1 with which the MLAG is assembled may reduce power consumption. The processes of steps S1 to S8 are performed at regular intervals. If "Yes" in step S8, the processes of and after step S9 are performed.

Next, a sequence of a process of turning OFF the switch 1 will be described. FIGS. 10A to 10F are diagrams illustrating the sequence of the process of turning OFF the switch 1. FIGS. 10A to 10F illustrate a case where the switch A is the master switch 1.

Figure 10A:
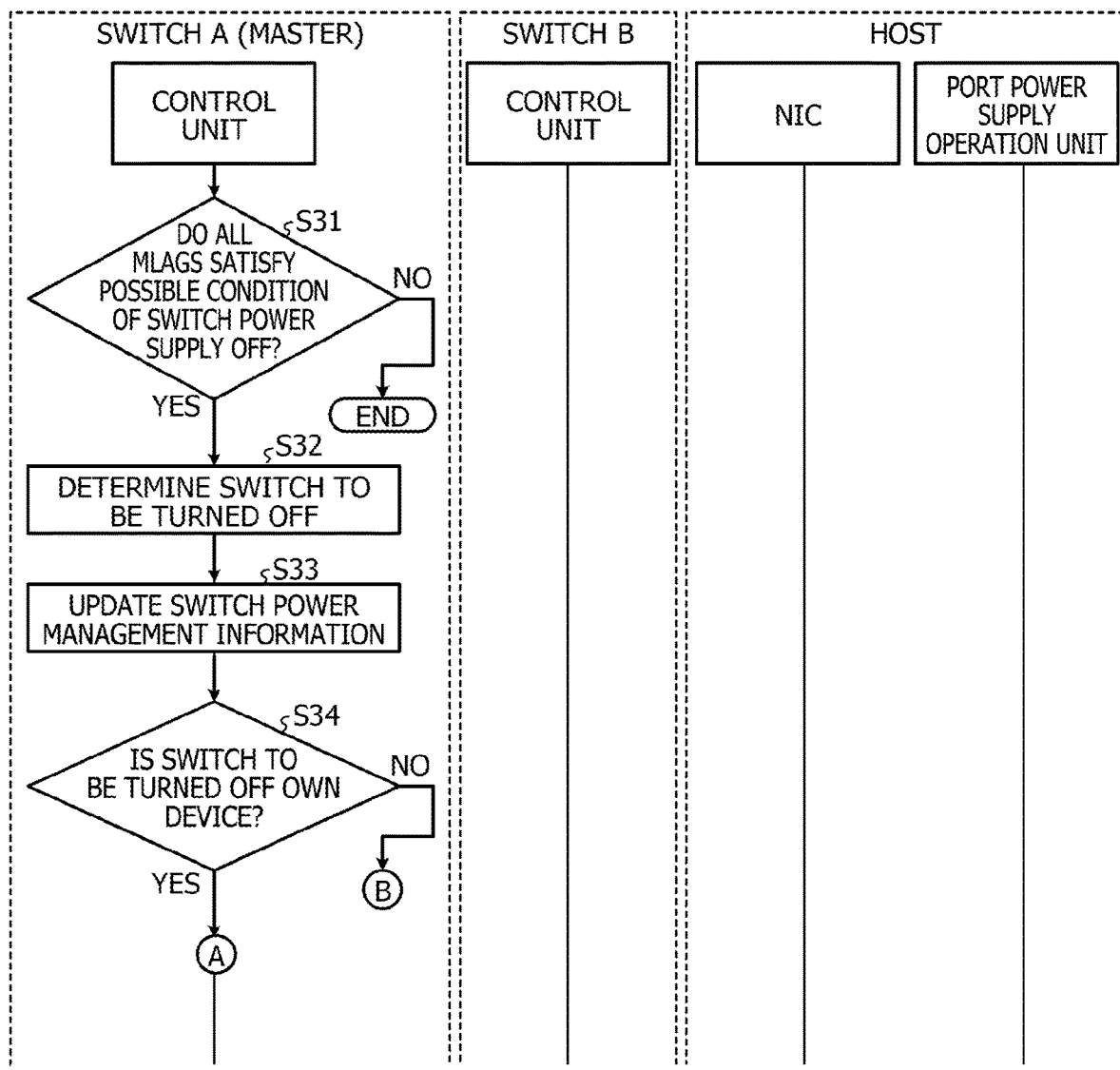
FIGS. 10A to 10F are diagrams illustrating a sequence of a process of turning OFF the switch.
Figure 10B:
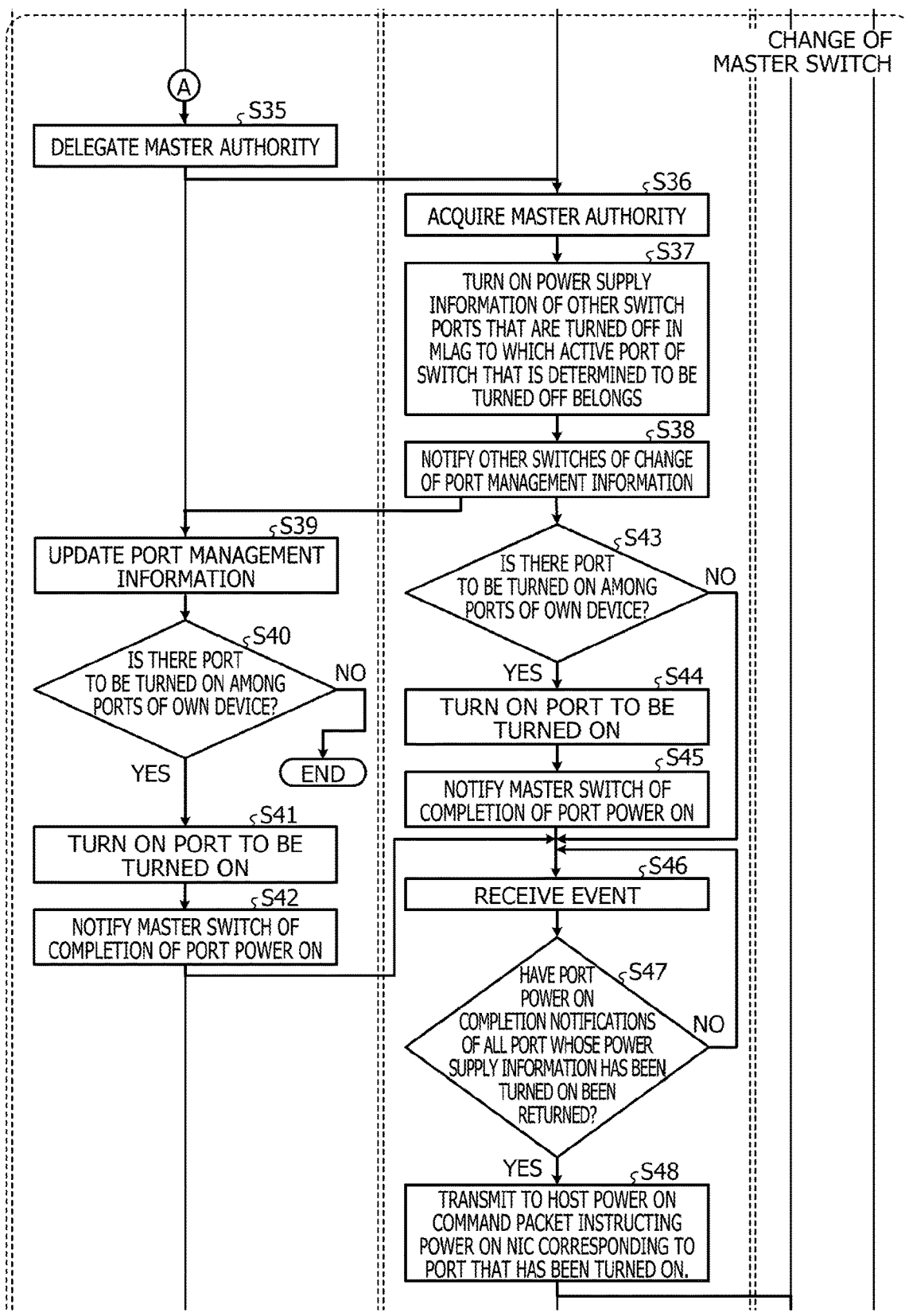

As illustrated in FIGS. 10A and 10B, the control unit 1c of the switch A determines whether all MLAGs satisfy the possible condition of switch power supply OFF (step S31). In a case where there is an MLAG that does not satisfy the possible condition of switch power supply OFF, the process is terminated.

On the other hand, in a case where all MLAGs satisfy the possible condition of switch power supply OFF, the control unit 1c of the switch A determines the switch 1 to be turned OFF (step S32), and updates the switch power management information (step S33). The switch power management information is information for managing the state of the power supply for each switch.

The control unit 1c of the switch A determines whether the switch 1 to be turned OFF is the own device (step S34). In a case where the switch 1 is the own device, the control unit 1c delegates the master authority to another switch 1 (step S35). The control unit 1c of the switch B acquires the master authority (step S36), and turns ON the power supply information of the other switch ports which are turned OFF in the MLAG to which the active port of the switch 1 that is determined to be turned OFF belongs (step S37).

The control unit 1c of the switch B notifies the other switches 1 of the change of the port management information (step S38). The control unit 1c of the switch A updates the port management information (step S39), and determines whether there is a port to be turned ON among the ports of the own device (step S40). In a case where there is no port to be turned ON among the ports of the own device, the control unit 1c of the switch A terminates the process.

On the other hand, in a case where there is a port to be turned ON among the ports of the own device, the control unit 1c of the switch A turns ON the port to be turned ON (step S41), and notifies the master switch 1 of the completion of port power ON (Step S42).

The control unit 1c of the switch B determines whether there is a port to be turned ON among the ports of the own device (step S43). In a case where there is no port to be turned ON among the ports of the own device, the process proceeds to step S46. On the other hand, in a case where there is a port to be turned ON among the ports of the own device, the control unit 1c of the switch B turns ON the port to be turned ON (step S44), and notifies the master switch 1 of the completion of port power ON (step S45).

Upon receiving the event of completion of port power ON (step S46), the control unit 1c of the switch B determines whether notifications of the completion of port power ON of all ports whose power supply information has been turned ON have been returned (step S47). In a case where there is a port for which the completion notice has not been returned, the control unit 1c of the switch B returns to step S46.

Figure 10C:
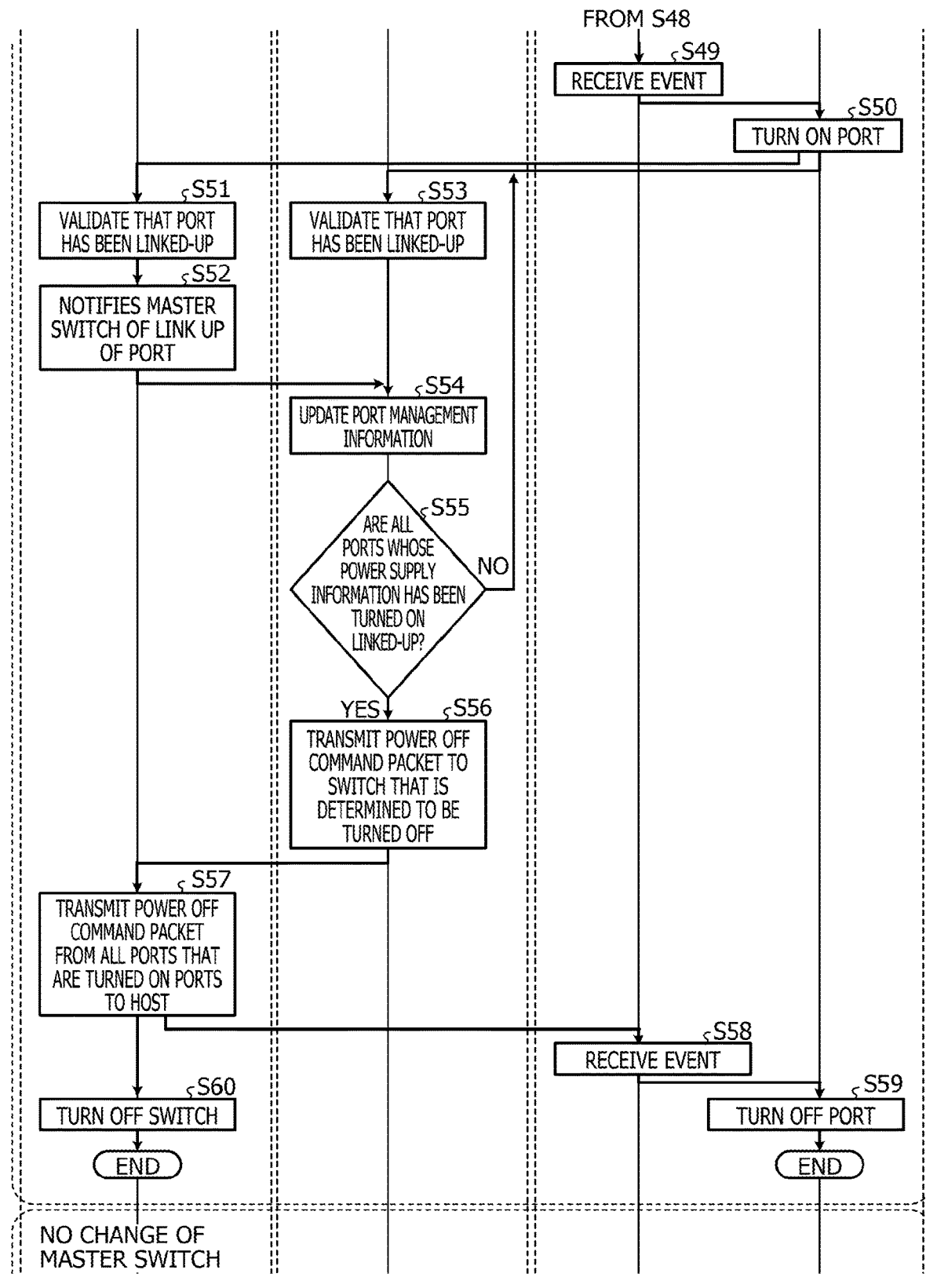
Figure 10D:
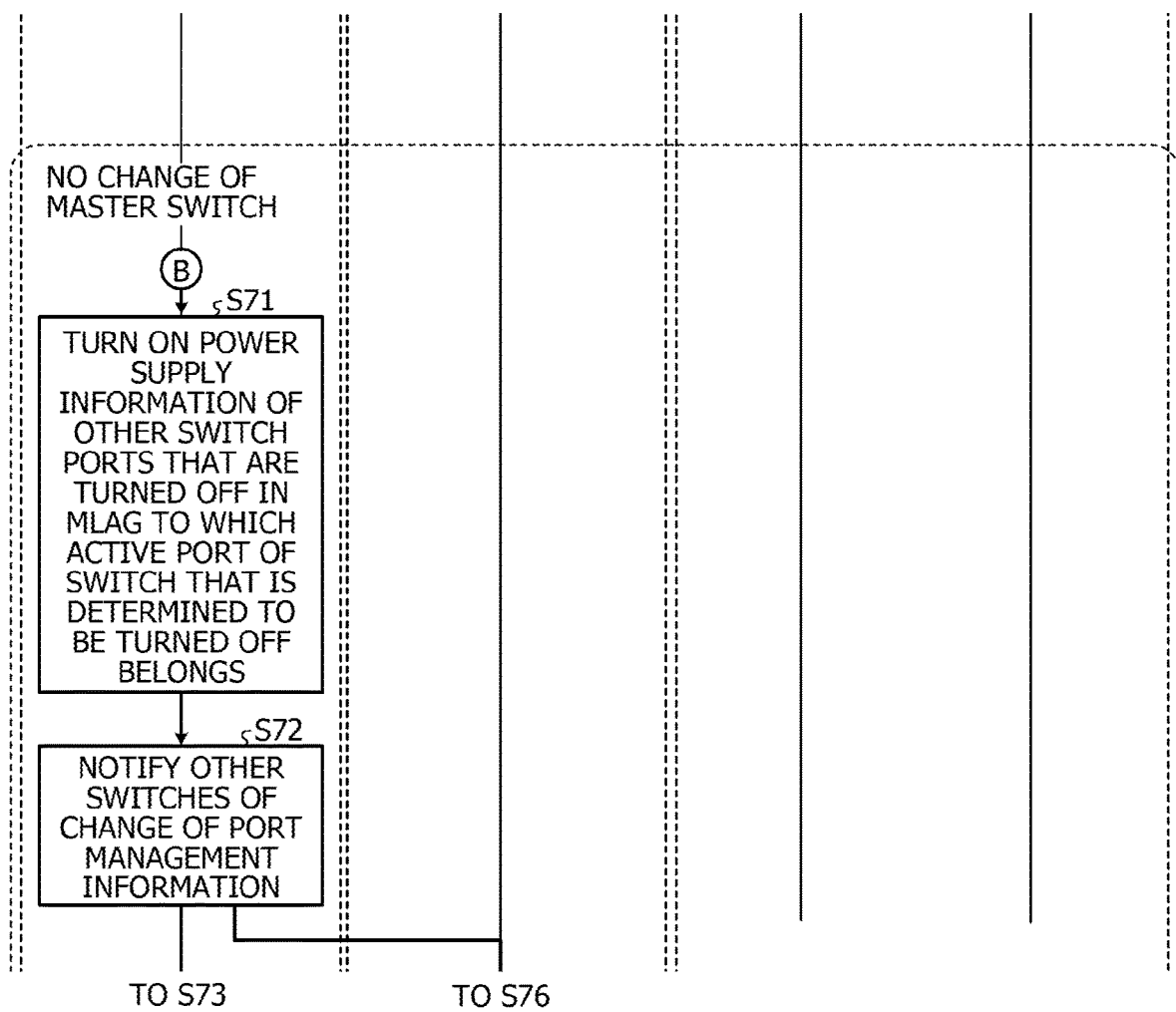

On the other hand, in a case where the completion notifications of all ports have been returned, the control unit 1c of the switch B transmits to the host a power ON command packet instructing to turn ON the NIC corresponding to the port that has been turned ON (step S48). As illustrated in FIGS. 10C and 10D, the NIC of the host receives the event with respect to the power ON command packet (step S49), and a port power supply operation unit of the host turns ON the port (step S50).

The control unit 1c of the switch A validates that the port has been linked-up (step S51), and notifies the master switch 1 of the link-up of the port (step S52). The control unit 1c of the switch B validates that the port has been linked-up (step S53), updates the port management information (step S54), and determines whether all ports whose power supply information has been turned ON are linked-up (step S55). In a case where there is a port that is not linked-up, the control unit 1c of the switch B returns to step S53.

On the other hand, in a case where all ports whose power supply information has been turned ON are linked-up, the control unit 1c of the switch B transmits a power OFF command packet to the switch 1 that is determined to be turned OFF (step S56). The control unit 1c of the switch A transmits the power OFF command packet to the host from all ports that are turned ON (step S57).

The NIC of the host receives the event with respect to the power OFF command packet (step S58), and a port power supply operation unit of the host turns OFF the port (step S59). The control unit 1c of the switch A turns OFF the switch 1 (step S60).

In a case where the switch 1 to be turned OFF is not the own device in step S34, the power supply information of the other switch ports which are turned OFF in the MLAG to which the active port of the switch 1 that is determined to be turned OFF belongs (step S71).

Figure 10E:
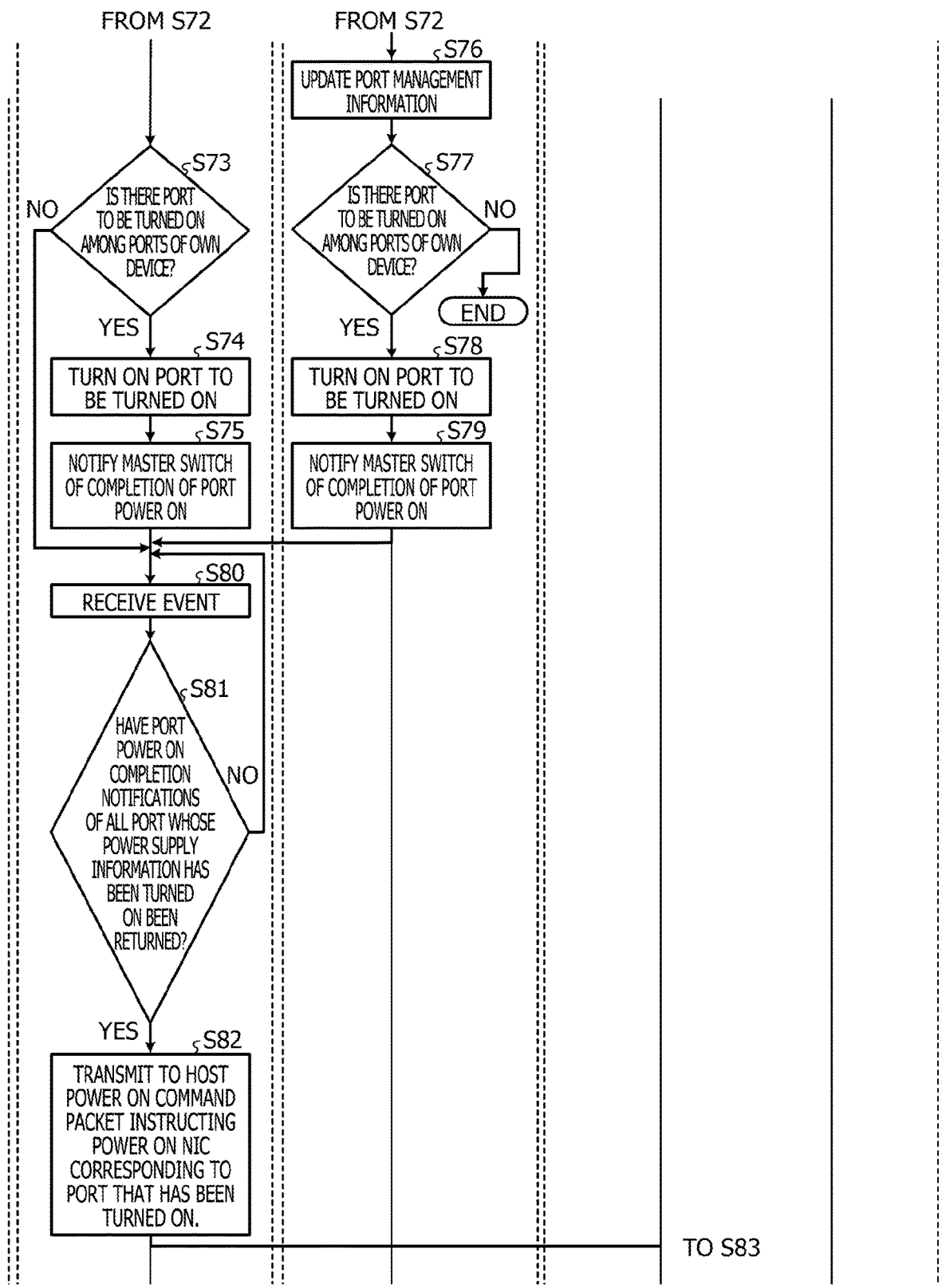
Figure 10F:
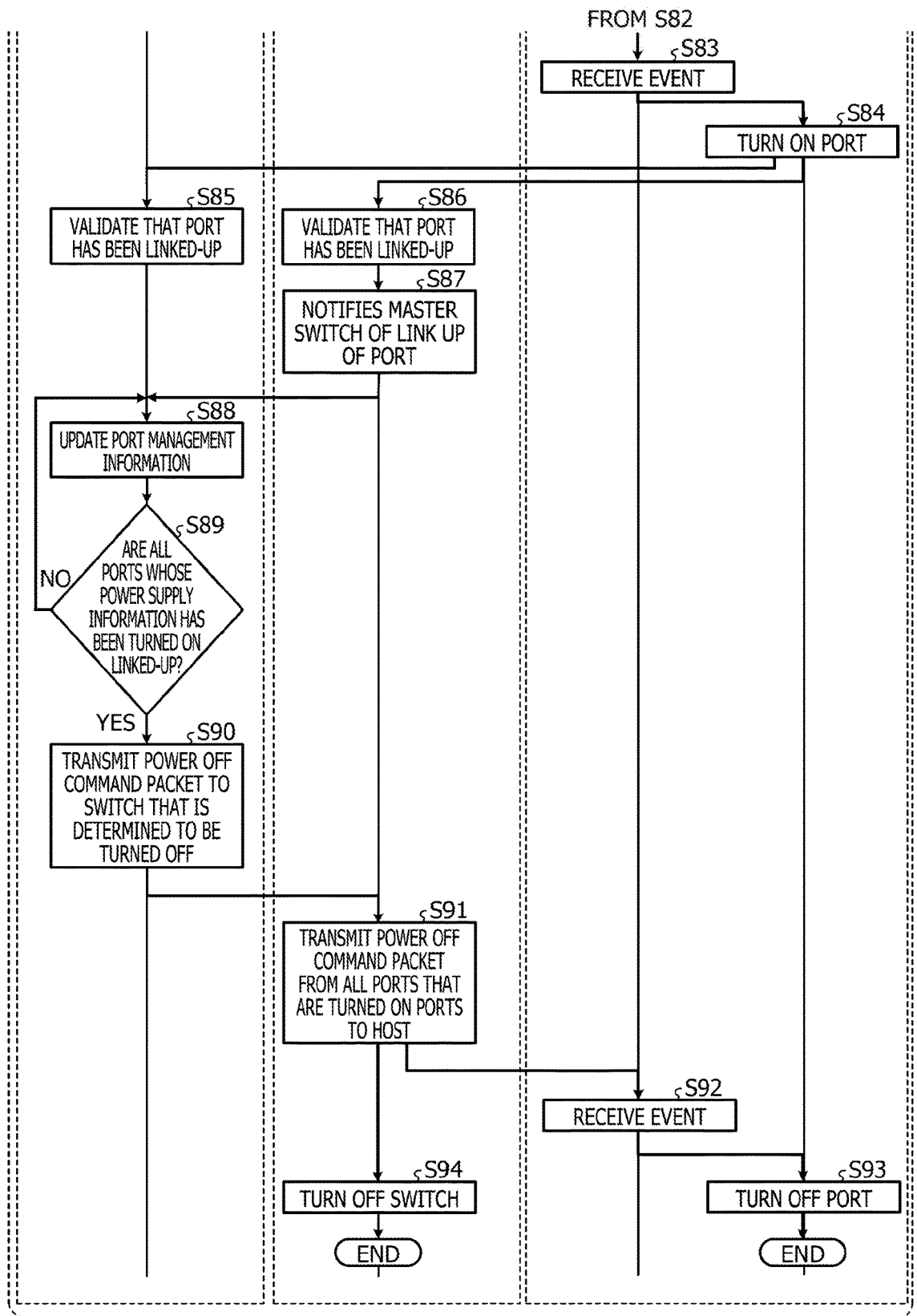

The control unit 1c of the switch A notifies the other switches 1 of the change of the port management information (step S72). As illustrated in FIGS. 10E and 10F, the control unit 1c of the switch A determines whether there is a port to be turned ON among the ports of the own device (step S73). In a case where there is no port to be turned ON among the ports of the own device, the control unit 1c of the switch A proceeds to step S80.

On the other hand, in a case where there is a port to be turned ON among the ports of the own device, the control unit 1c of the switch A turns ON the port to be turned ON (step S74), and notifies the master switch 1 of the completion of port power ON (Step S75).

The control unit 1c of the switch B updates the port management information (step S76), and determines whether there is a port to be turned ON among the ports of the own device (step S77). In a case where there is no port to be turned ON among the ports of the own device, the process is terminated. On the other hand, in a case where there is a port to be turned ON among the ports of the own device, the control unit 1c of the switch B turns ON the port to be turned ON (step S78), and notifies the master switch 1 of the completion of port power ON (step S79).

Upon receiving the event of completion of port power ON (step S80), the control unit 1c of the switch A determines whether notifications of the completion of port power ON of all ports whose power supply information has been turned ON have been returned (step S81). In a case where there is a port for which the completion notification has not been returned, the control unit 1c of the switch A returns to step S80.

On the other hand, in a case where the completion notifications of all ports have been returned, the control unit 1c of the switch A transmits to the host a power ON command packet instructing to turn ON the NIC corresponding to the port that has been turned ON (step S82). The NIC of the host receives the event with respect to the power ON command packet (step S83), and a port power supply operation unit of the host turns ON the port (step S84).

The control unit 1c of the switch A validates that the port has been linked-up (step S85). The control unit 1c of the switch B validates that the port has been linked-up (step S86), and notifies the link up of the port to the master switch 1 (step S87). The control unit 1c of the switch A updates the port management information (step S88), and determines whether all ports whose power supply information has been turned ON are linked-up (step S89). In a case where there is a port that has not been linked-up, the control unit 1c of the switch A returns to step S88.

On the other hand, in a case where all ports whose power supply information has been turned ON are linked-up, the control unit 1c of the switch A transmits a power OFF command packet to the switch 1 which is determined to be turned OFF (step S90). The control unit 1c of the switch B transmits the power OFF command packet to the host from all ports that are turned ON (step S91).

The NIC of the host receives the event with respect to the power OFF command packet (step S92), and the port power supply operation unit of the host turns off the port (step S93). The control unit 1c of the switch B turns OFF the switch 1 (step S94).

In this manner, in a case where all MLAGs satisfy the possible condition of switch power supply OFF, the power ON port of the switch 1 to be turned OFF is transferred to the power OFF port of the other switches 1 in the same MLAG, whereby the power OFF port is bought to one switch 1. Therefore, it is possible to turn OFF the power supply of one switch 1 in the switches 1 with which the MLAG is assembled.

Figure 11A:
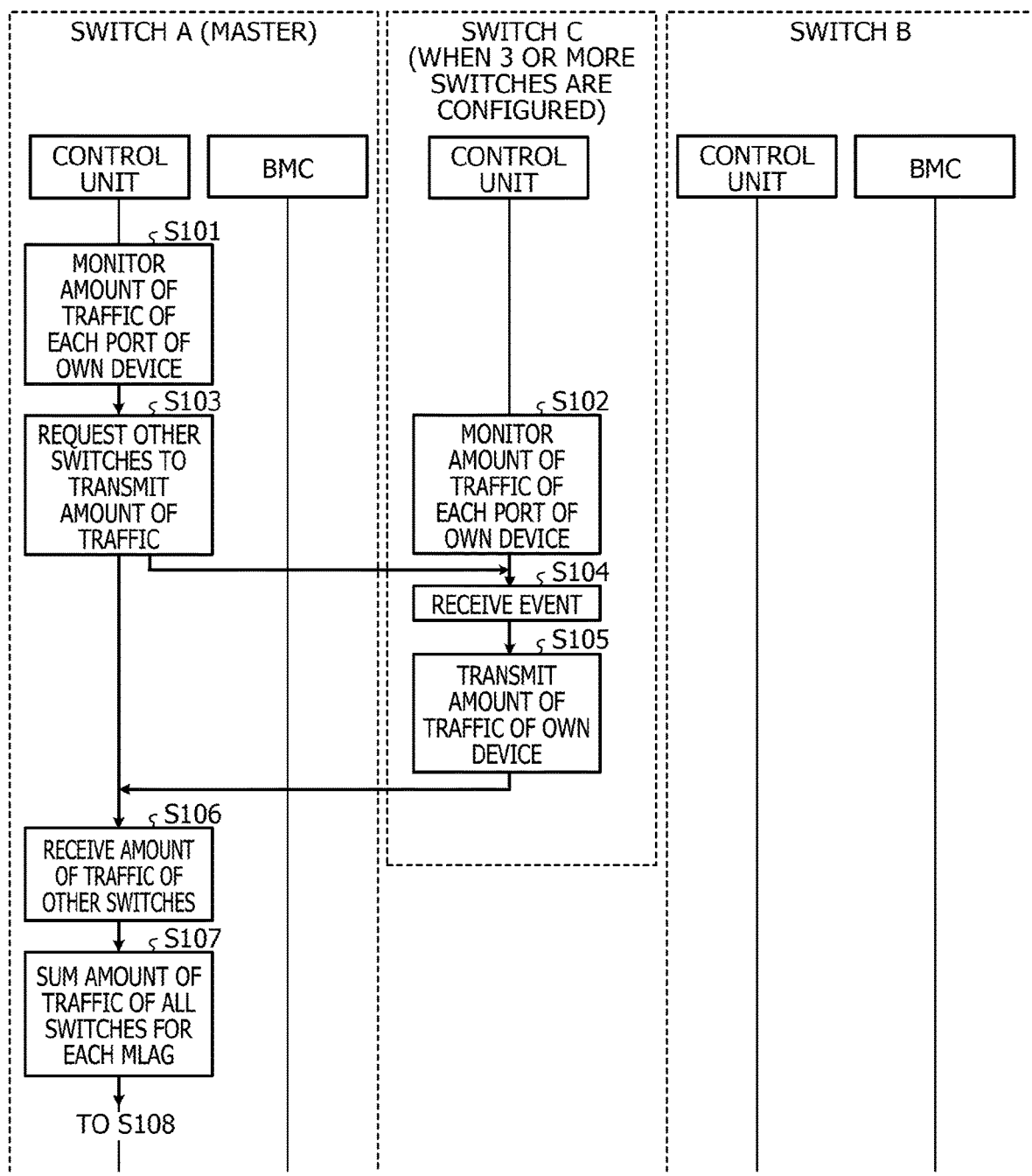
FIGS. 11A and 11B are diagrams illustrating a sequence of a process of restoring the switch in a case of an increase in traffic.
Figure 11B:
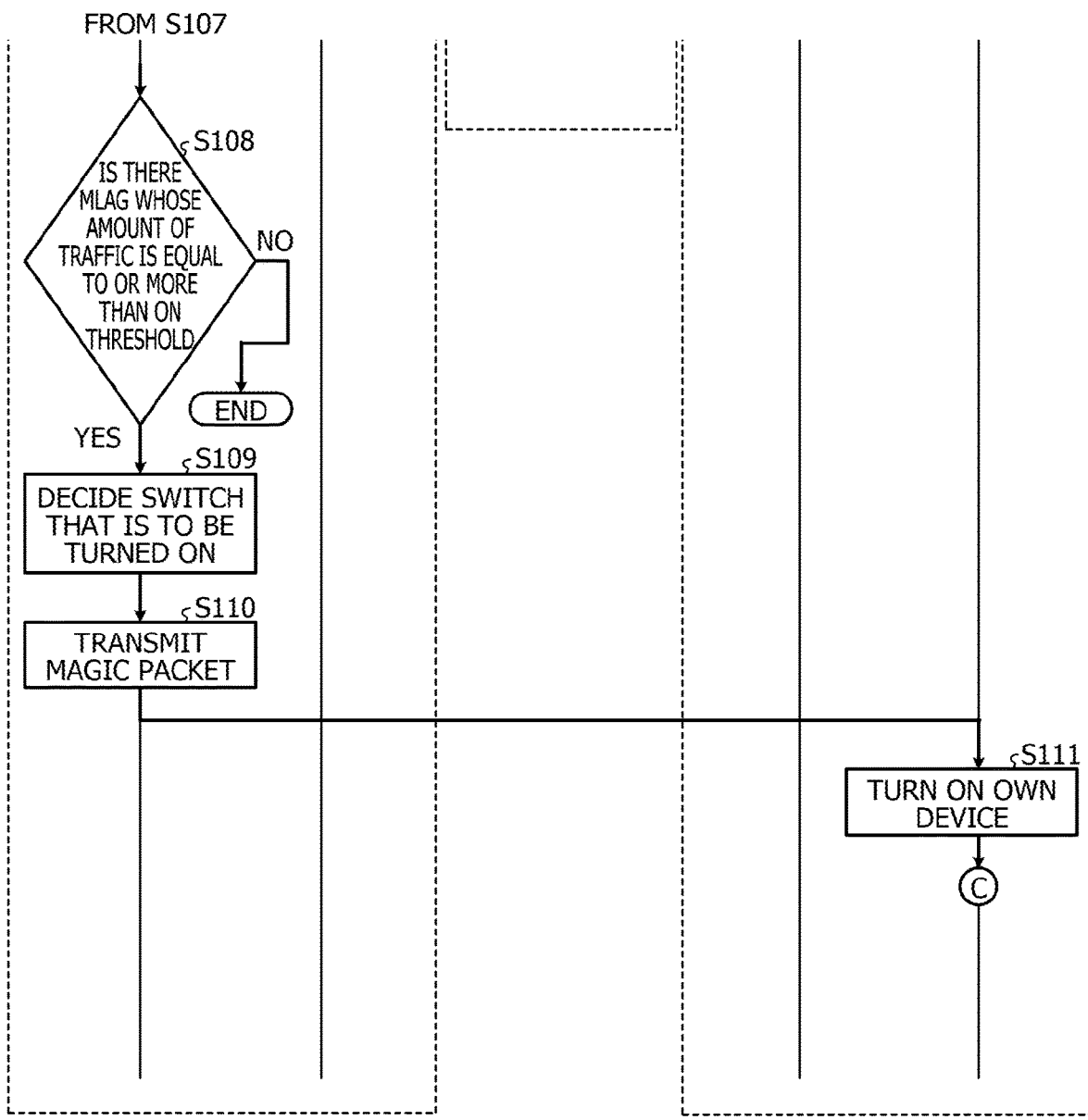

Next, a sequence of a process of restoring the switch in a case of an increase in traffic will be described. FIGS. 11A and 11B are diagrams illustrating a sequence of a process of restoring the switch in a case of an increase in traffic. FIGS. 11A and 11B illustrate a case where the switch A is the master switch 1, the switch C is turned ON, and the switch B is restored.

As illustrated in FIGS. 11A and 11B, the control unit 1c of the switch A monitors the amount of traffic of each port of the own device (step S101). The control unit 1c of the switch C monitors the amount of traffic of each port of the own device (step S102). The control unit 1c of the switch A requests the other switches 1 to transmit the amount of traffic (step S103).

The control unit 1c of the switch C receives an event requesting the transmission of the amount of traffic (step S104), and transmits the amount of traffic of the own device to the switch A (step S105). The control unit 1c of the switch A receives the amount of traffic of the other switches 1 (step S106), and totals the amount of traffics of all switches 1 for each MLAG (step S107).

The control unit 1c of the switch A determines whether there is an MLAG whose amount of traffic is equal to or more than the ON threshold (step S108). If there is no MLAG, the process is terminated. On the other hand, in a case where there is an MLAG whose amount of traffic is equal to or more than the ON threshold, the control unit 1c of the switch A determines the switch 1 to be turned ON (step S109), and transmits a magic packet to the determined switch 1, that is, the switch B (step S110). The BMC 1b of the switch B turns ON the own device (step S111). Control is transferred to step S159 in FIG. 14.

In this way, in a case where there is an MLAG whose amount of traffic is equal to or more than the ON threshold, the switch 1 with which the MLAG is assembled may cope with an increase in traffic by restoring switch 1 that is turned OFF.

Figure 12A:
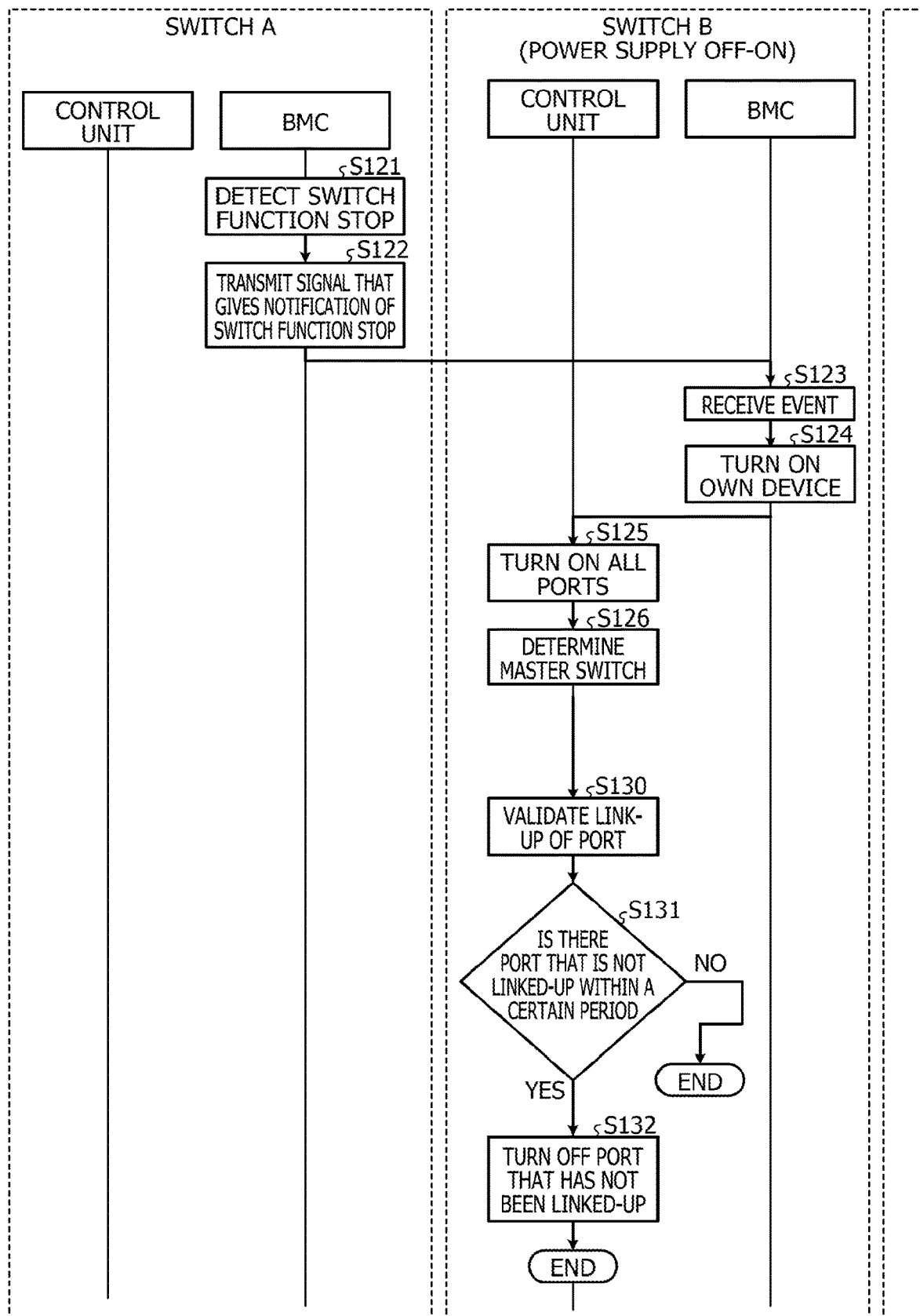
FIGS. 12A and 12B are diagrams illustrating a sequence of a process of restoring the switch in a case of partial failure of an active switch.
Figure 12B:
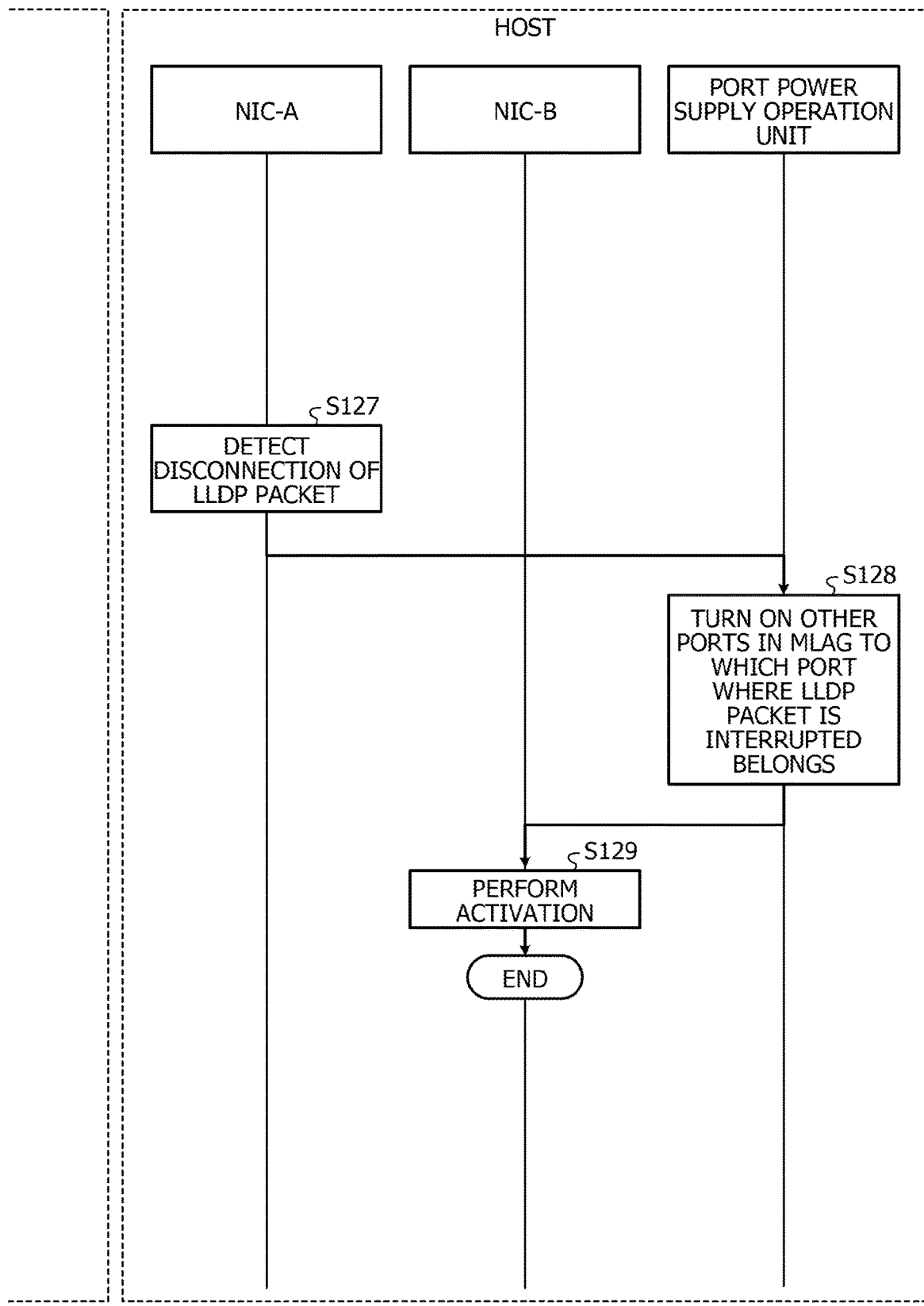

Next, the sequence of a process of restoring the switch in a case of a partial failure of the active switch 1 will be described. FIGS. 12A and 12B are diagrams illustrating a sequence of a process of restoring the switch in a case of a partial failure of the active switch 1. FIGS. 12A and 12B illustrate a case where the switch A is the master switch 1, a partial failure occurs in the switch A, and the switch B is restored. The NIC-A of the host is connected to the switch A, and the NIC-B of the host is connected to the switch B.

As illustrated in FIGS. 12A and 12B, the BMC 1b of the switch A detects a stop of the switch function (step S121), and transmits a signal that notifies the switch B of the switch function stop (step S122). The BMC 1b of the switch B receives an event giving a notification of the switch function stop (step S123), and turns ON the own device (step S124).

The control unit 1c of the switch B turns ON all ports (step S125), and determines the master switch 1 among the other active switches 1 (step S126).

The NIC-A of the host detects the disconnection of the LLDP packet (step S127), and notifies the port power supply operation unit of the disconnection. The port power supply operation unit turns ON the other ports in the MLAG to which the port where the LLDP packet is interrupted belongs (step S128), and the NIC-B is activated (step S129).

The control unit 1c of the switch B validates that the port has been linked-up (step S130) and validates whether there is a port that is not linked-up within a certain period (step S131). In a case where there are no ports that are not linked-up within a certain period, the control unit 1c of the switch B terminates the process. In a case where there is a port that is not linked-up within a certain period, the control unit 1c of the switch B turns off the port that has not been linked-up (step S132).

In this manner, when the BMC 1*b* is notified of the switch function stop, the BMC 1*b* turns ON the own device, whereby it is possible to deal with the stop of the switch function of the active switch 1.

Figure 13A:
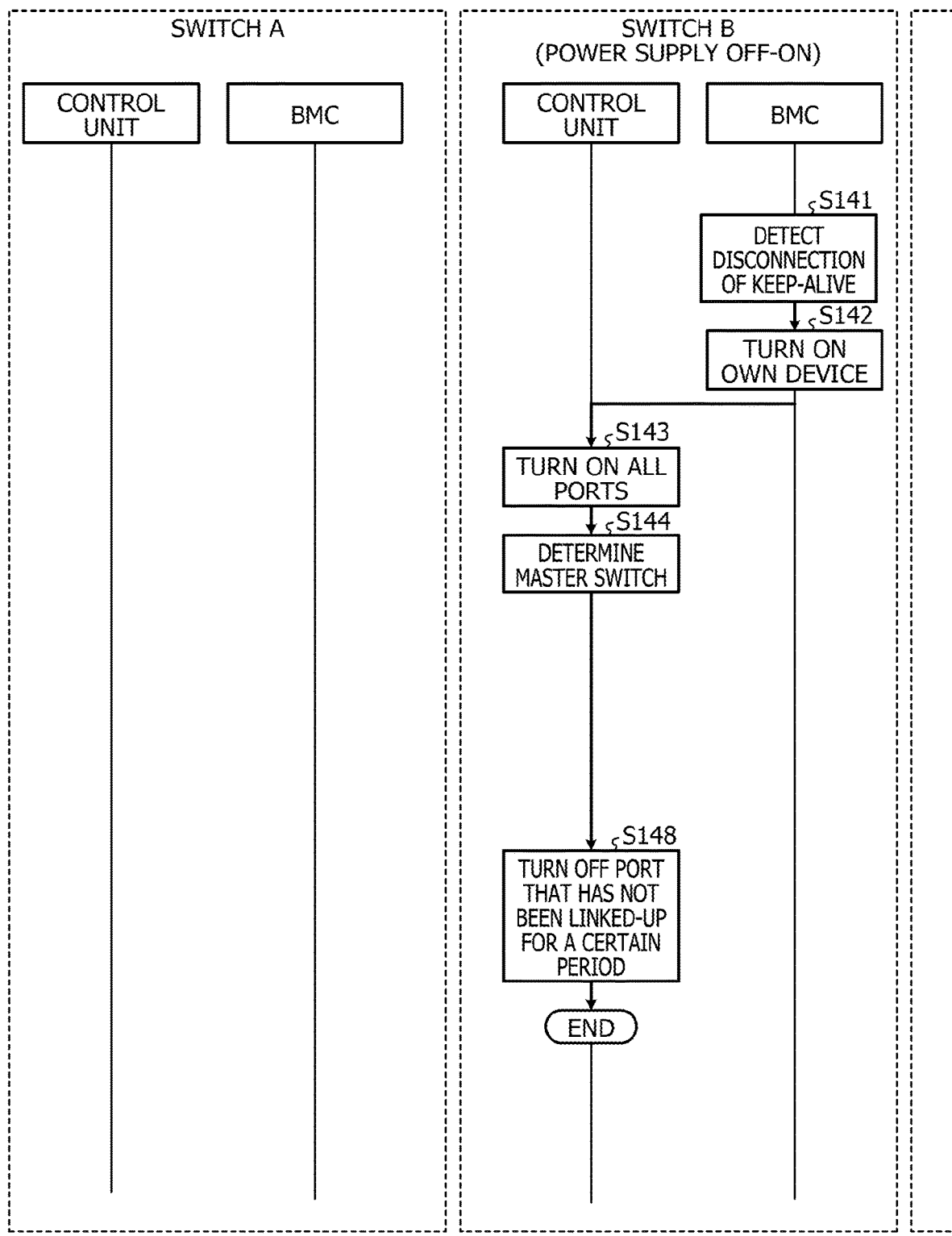
FIGS. 13A and 13B are diagrams illustrating a sequence of a process of restoring the switch in a case of a stop of the active switch.
Figure 13B:
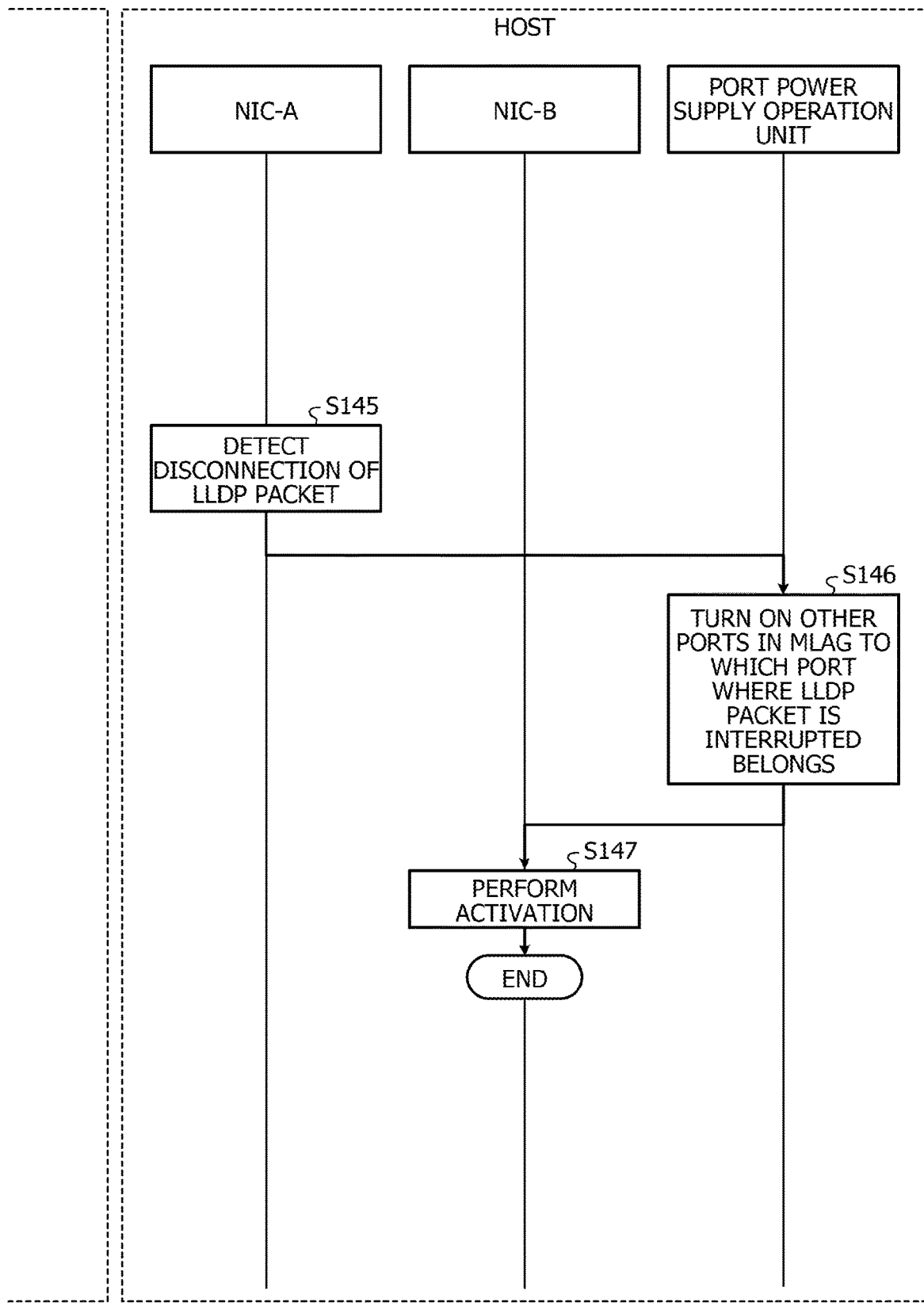

Next, a sequence of a process of restoring the switch in a case of a stop of the active switch 1 will be described. FIGS. 13A and 13B are diagrams illustrating a sequence of a process of restoring the switch in a case of a stop of the active switch 1. FIGS. 13A and 13B illustrate a case where the switch A is the master switch 1, the switch A stops, and the switch B is restored. The NIC-A of the host is connected to the switch A, and the NIC-B of the host is connected to the switch B.

As illustrated in FIGS. 13A and 13B, the BMC 1*b* of the switch B detects disconnection of the Keep-Alive from the switch A (step S141), and turns ON the own device (step S142). The control unit 11*c* of the switch B turns ON all ports (step S143), and determines the master switch 1 among the other active switches 1 (step S144).

The NIC-A of the host detects disconnection of the LLDP packet (step S145), and notifies the port power supply operation unit of the disconnection. The port power supply operation unit turns ON the other ports in the MLAG to which the port where the LLDP packet is interrupted belongs (step S146), and the NIC-B starts (step S147). The control unit 1*c* of the switch B turns OFF the port that has not been linked-up for a certain period (step S148).

In this way, after the BMC 1*b* detects disconnection of the Keep-Alive, the BMC 1*b* turns ON the own device, whereby it is possible to deal with the stop of the active switch 1.

Figure 14A:
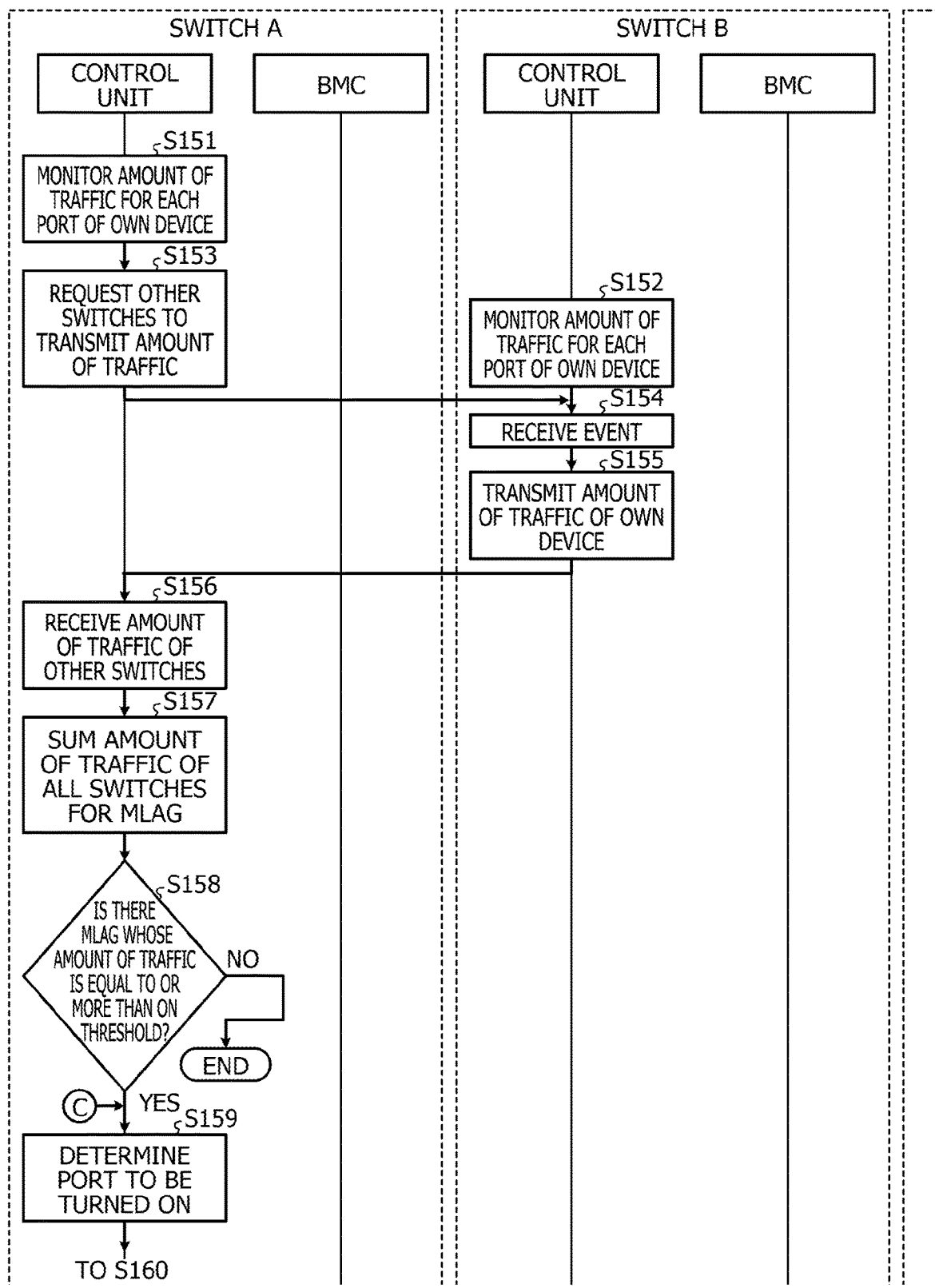
Figure 14B:
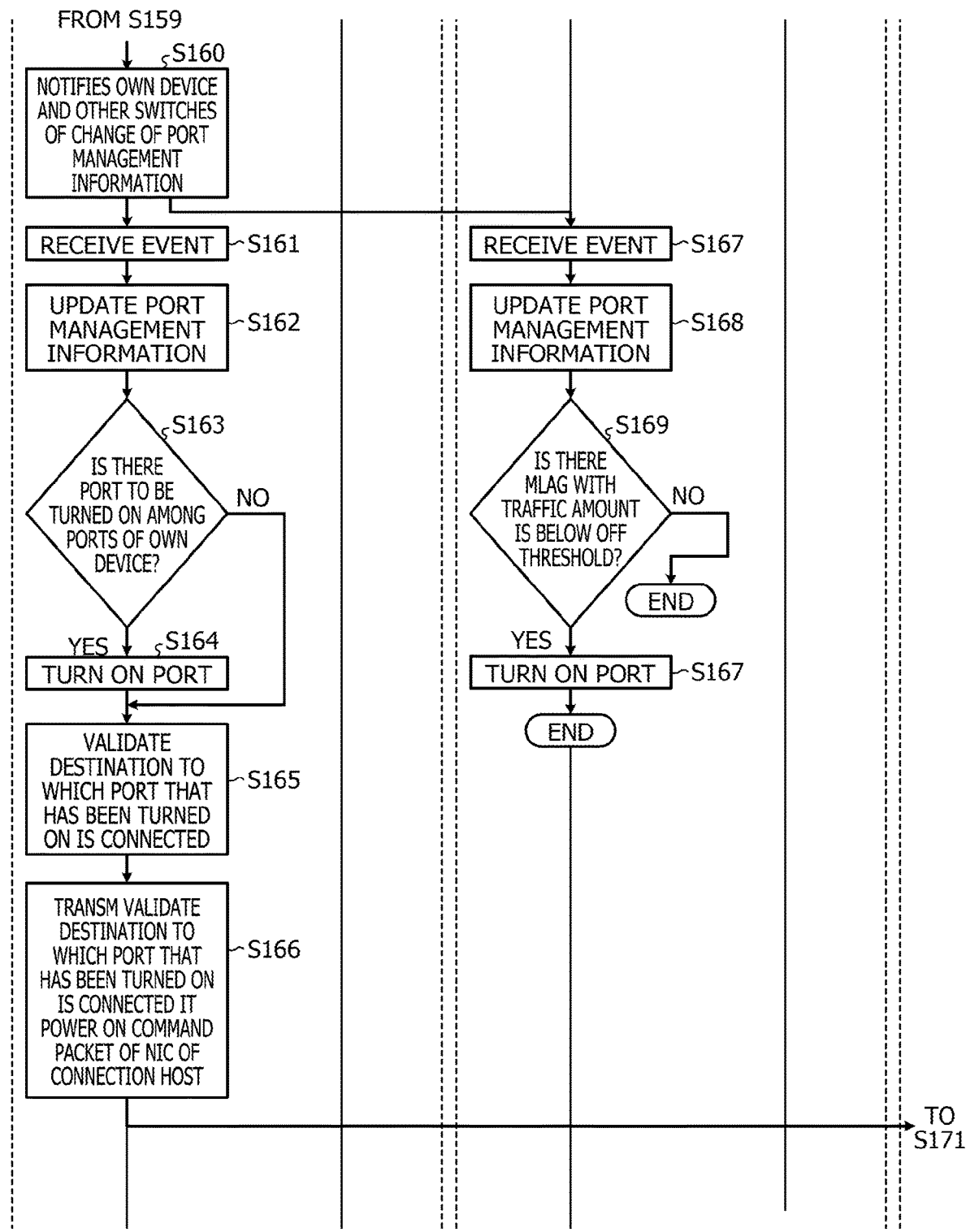

Next, a sequence of a process of restoring the port will be described. FIGS. 14A to 14C are diagrams illustrating a sequence of a process of restoring the port. FIGS. 14A to 14C illustrate a case where the switch A is the master switch 1. The NIC-A of the host is connected to the switch A, and the NIC-B of the host is connected to the switch B.

As illustrated in FIGS. 14A to 14C, the control unit 1*c* of the switch A monitors the amount of traffic of each port of the own device (step S151). The control unit 1*c* of the switch B monitors the amount of traffic of each port of the own device (step S152). The control unit 1*c* of the switch A requests the other switches 1 to transmit the amount of traffic (step S153).

The control unit 1*c* of the switch B receives an event requesting the transmission of the amount of traffic (step S154), and transmits the amount of traffic of the own device to the switch A (step S155). The control unit 1*c* of the switch A receives the amount of traffic of the other switches 1 (step S156), and totals the amount of traffic of all the switches 1 for each MLAG (step S157).

The control unit 1*c* of the switch A determines whether there is an MLAG whose amount of traffic is equal to or more than the ON threshold (step S158). If there is no MLAG, the process is terminated. On the other hand, in a case where there is an MLAG equal to or less than the ON threshold, the control unit 1*c* of the switch A determines the port to be turned ON (step S159), and notifies the own device and the other switches 1 of the change of the port management information (step S160).

Upon receiving an event giving a notification of the change of the port management information (step S161), the control unit 1*c* of the switch A updates the port management information (step S162), and determines whether there is a port to be turned ON among the ports of the own device (step S163). In a case where there is no port to be turned ON among the ports of the own device, the control unit 1*c* of the switch A proceeds to step S165.

On the other hand, in a case where there is a port to be turned ON among the ports of the own device, the control unit 1*c* of the switch A turns ON the port (step S164) validates the destination to which the port that has been turned ON is connected (step S165). The control unit 1*c* of the switch A transmits the power ON command packet of the NIC of the connection host to the host (step S166).

Upon receiving an event giving a notification of the change of the port management information (step S167), the control unit 1*c* of the switch B updates the port management information (step S168), and determines whether there is a port to be turned ON among the ports of the own device (step S169). In a case where there is no port to be turned ON among the ports of the own device, the control unit 1*c* of the switch B terminates the process. On the other hand, in a case where there is a port to be turned ON among the ports of the own device, the control unit 1*c* of the switch B turns ON the port (step S170).

The NIC-A of the host receives the event with respect to the power ON command packet (step S171), and the port power supply operation unit of the host turns ON the NIC which has received the power ON command (step S172). In a case where the NIC that has received the power ON command is the NIC-B, the NIC-B is activated (step S173).

In this way, in a case where there is an MLAG whose amount of traffic is equal to or less than the ON threshold, the master switch 1 determines the port to be turned ON. The master switch 1 transmits a power ON command packet to the host having the NIC corresponding to the port to be turned ON. The switch 1 having the port to be turned ON turns ON the port. Therefore, the switch 1 with which the MLAG is assembled may cope with an increase in amount of traffic.

Figure 15:
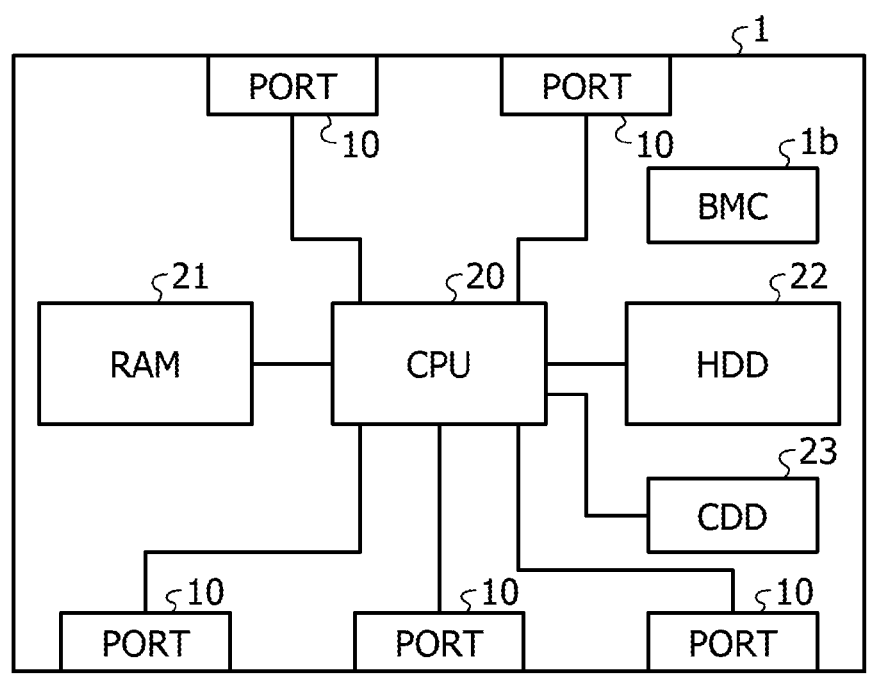
FIG. 15 is a diagram illustrating a hardware configuration of the switch.
Figure 16:
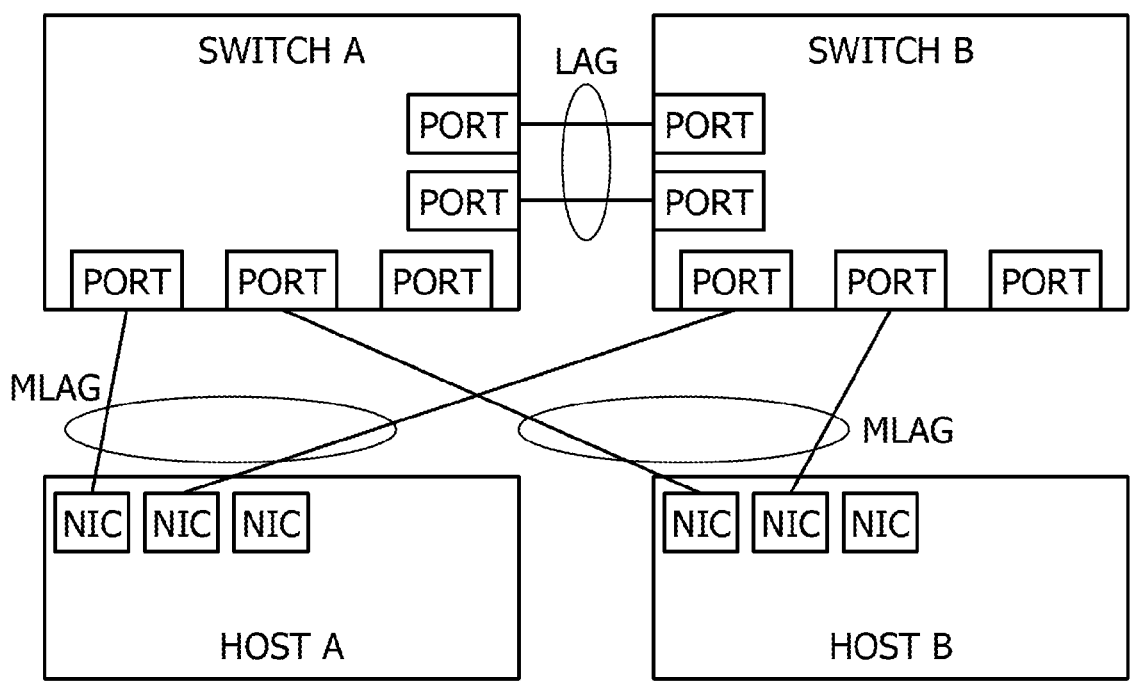
FIG. 16 is a diagram for explaining an LAG and an MLAG.

Next, the hardware configuration of the switch 1 will be described. FIG. 15 is a diagram illustrating a hardware configuration of the switch 1. As illustrated in FIG. 15, the switch 1 includes five ports 10, a central processing unit (CPU) 20, a random access memory (RAM) 21, a hard disk drive (HDD) 22, and a compact disk drive (CDD) 23. The switch 1 may have more than five ports 10 or less than five ports 10.

The CPU 20 is a central processing unit that reads out and executes a program from the RAM 21. The RAM 21 is a volatile memory that stores programs, intermediate results of executing programs, and the like. The HDD 22 is a disk device that stores programs and data. The CDD 23 is a device that reads and writes CD-Rs.

The program executed in the switch 1 is stored in a CD-R, which is an example of a recording medium readable by the CPU 20, read out from the CD-R by the CDD 23, and installed in the switch 1. Alternatively, the program is stored in a database or the like of a computer system connected via a LAN, read out from these databases and installed in the switch 1. The installed program is stored in the HDD 22, read by the RAM 21, and executed by the CPU 20.

As described above, in the embodiment, the port information management unit 11 monitors the amount of traffic for each port at regular time intervals, and exchanges amount of traffic of each port with the other switches 1. The port information management unit 11 of the master switch 1 calculates the amount of traffic of each MLAG determines whether there is an MLAG whose amount of traffic is equal to or less than the OFF threshold. When there is an MLAG whose amount of traffic is equal to or less than the OFF threshold, the state change determination unit 12 of the master switch 1 identifies, based on the amount of traffic of each port in the MLAG, the port to be turned OFF from among the ports belonging to the MLAG. After transmitting the power OFF command packet from the identified port to the host, the port power supply control unit 13 of the switch 1 having the identified port turns OFF the identified port. Therefore, the switch 1 with which the MLAG is assembled may avoid unnecessary power consumption.

In the embodiment, the state change determination unit 12 of the master switch 1 identifies the switch 1 to be turned OFF in a case where the possible condition of switch power supply OFF in the MLAG is satisfied. The state change determination unit 12 of the master switch 1 identifies a second port which is a substitute for a first port that is turned ON in the identified switch 1 from the ports of switch 1 that is turned ON except the identified switch 1. After performing control to turn ON the second port, the state change determination unit 12 of the master switch 1 performs control to turn OFF the first port. The switch power supply control unit 14 of the switch 1 identified by the state change determination unit 12 of the master switch 1 turns OFF the own device. Therefore, the switch 1 with which the MLAG is assembled may avoid unnecessary power consumption.

In the embodiment, when MLAG is assembled with n relay devices, the possible condition of switch power supply OFF means that 1/n or more of the ports belonging to the MLAG are turned OFF, whereby the master switch 1 may accurately determine whether the port may be turned OFF.

In the embodiment, the port management information storage unit 1a stores the port management information, and the state change determination unit 12 updates the port management information of all switches 1 with respect to the port to be turned OFF. The port power supply control unit 13 turns OFF the port that is determined to be turned OFF by the state change determination unit 12 based on the updated port management information. Therefore, the master switch 1 may securely turn OFF the port that is determined to be turned OFF.

In the embodiment, the port information management unit 11 of the master switch 1 determines whether there is an MLAG whose amount of traffic is equal to or more than the ON threshold. In a case where there is an MLAG whose amount of traffic is equal to or less than the ON threshold, the state change determination unit 12 of the master switch 1 identifies a port that is turned OFF where the switch 1 is turned ON from among the ports belonging to the MLAG. The port power supply control unit 13 of the switch 1 having the identified port turns ON the identified port. Therefore, the switch 1 with which the MLAG is assembled may respond appropriately to an increase in traffic.

In the embodiment, in a case where there is an MLAG whose traffic volume is equal to or less than the ON threshold value and there is no port that is turned OFF where the switch 1 is turned ON among the ports belonging to the MLAG, the state change determination unit 12 of the master switch 1 identifies the switch 1 to be turned ON, and perform control to turn ON the identified switch 1. Therefore, even when there is no port to be turned ON among the ports belonging to the MLAG, the switch 1 incorporating the MLAG may cope with an increase in traffic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A relay device comprising: one or more memories; and one or more processors coupled to the one or more memories and the one or more processors configured to:

based on an amount of traffic regarding each of a plurality of ports included in a plurality of relay devices including the relay device belonging to an MLAG, determine whether a total amount of traffic in the MLAG is no more than a first threshold, in a case where the total amount of traffic in the MLAG is no more than the first threshold, select a first port from among the plurality of ports in accordance with the amount of traffic regarding each of the plurality of ports, turn off the first port in a case where the first port is included in the relay device, in a case where a power state of the plurality of ports satisfies a condition, select a first relay device that is to be turned off from among the plurality of relay devices, and select a second port which is a substitute for a third port that is turned on in the selected first relay device from among ports included in a second relay device, the ports being turned off, perform control the first relay device and the second relay device in such a way that the second port is turned on and the third port is turned off, turn off the relay device in a case where the first relay device is the relay device, and transmit a command to the first relay device to turn off power in a case where the first relay device is not the relay device.

2. The relay device according to claim 1, the one or more processors further configured to identify an information processing apparatus connected to the second port when the control is executed, and transmit another command to the identified information processing apparatus to turn on a network interface connected to the second port.

3. The relay device according to claim 1, wherein the condition is that, in a case where the plurality of relay devices is n relay devices, 1/n or more of the plurality of ports are turned off.

4. The relay device according to claim 1, the one or more processors further configured to update management information indicating a power state of each of the plurality of ports to indicate that a power state of the first port is turn off, and transmit the updated management information to the plurality of relay devices except the relay device.

5. The relay device according to claim 1, the one or more processors further configured to determine whether the total amount of traffic in the MLAG is no less than a second threshold, in a case where the total amount of traffic in the MLAG is no less than the second threshold, select, from among the plurality of ports, a second port of the first relay device that is turned on, the second port being turned off, turn on the second port in a case where the first relay device is the relay device, and transmit a command to the first relay device to turn on the second port in a case where the first relay device is not the relay device.

6. The relay device according to claim 1, the one or more processors further configured to determine whether the total amount of traffic in the MLAG is no less than a second threshold, in a case where the total amount of traffic in the MLAG is no less than the second threshold, select a first relay device that is to be turned on from among the plurality of relay devices, and perform control the first relay device to turn on.

7. A relay method executed by a relay device, the relay method comprising:
   based on an amount of traffic regarding each of a plurality of ports included in a plurality of relay devices including the relay device belonging to an MLAG, determining whether a total amount of traffic in the MLAG is no more than a first threshold;
   in a case where the total amount of traffic in the MLAG is no more than the first threshold, selecting a first port from among the plurality of ports in accordance with the amount of traffic regarding each of the plurality of ports;
   turning off the first port in a case where the first port is included in the relay device;
   in a case where a power state of the plurality of ports satisfies a condition, selecting a first relay device that is to be turned off from among the plurality of relay devices, and selecting a second port which is a substitute for a third port that is turned on in the selected first relay device from among ports included in a second relay device, the ports being turned off;
   performing control of the first relay device and the second relay device in such a way that the second port is turned on and the third port is turned off;
   turning off the relay device in a case where the first relay device is the relay device; and
   transmitting a command to the first relay device to turn off power in a case where the first relay device is not the relay device.

8. The relay method according to claim 7, further comprising:
   identifying an information processing apparatus connected to the second port; and
   transmitting another command to the identified information processing apparatus to turn on a network interface connected to the second port.

9. The relay method according to claim 7, wherein the condition is that, in a case where the plurality of relay devices is n relay devices, 1/n or more of the plurality of ports are turned off.

10. The relay method according to claim 7, further comprising:
    updating management information indicating a power state of each of the plurality of ports to indicate that a power state of the first port is turn off; and
    transmitting the updated management information to the plurality of relay devices except the relay device.

11. The relay method according to claim 7, further comprising:
    determining whether the total amount of traffic in the MLAG is no less than a second threshold;
    in a case where the total amount of traffic in the MLAG is no less than the second threshold, selecting, from among the plurality of ports, a second port of the first relay device that is turned on, the second port being turned off;
    turning on the second port in a case where the first relay device is the relay device; and
    transmitting a command to the first relay device to turn on the second port in a case where the first relay device is not the relay device.

12. The relay method according to claim 7, further comprising:
    determining whether the total amount of traffic in the MLAG is no less than a second threshold;
    in a case where the total amount of traffic in the MLAG is no less than the second threshold, selecting a first relay device that is to be turned on from among the plurality of relay devices; and
    performing control the first relay device to turn on.

13. A non-transitory computer-readable medium storing a relay program that causes a relay device to execute a process comprising:
    based on an amount of traffic regarding each of a plurality of ports included in a plurality of relay devices including the relay device belonging to an MLAG, determining whether a total amount of traffic in the MLAG is no more than a first threshold;
    in a case where the total amount of traffic in the MLAG is no more than the first threshold, selecting a first port from among the plurality of ports in accordance with the amount of traffic regarding each of the plurality of ports;
    turning off the first port in a case where the first port is included in the relay device;
    in a case where a power state of the plurality of ports satisfies a condition, selecting a first relay device that is to be turned off from among the plurality of relay devices, and selecting a second port which is a substitute for a third port that is turned on in the selected first relay device from among ports included in a second relay device, the ports being turned off;
    performing control of the first relay device and the second relay device in such a way that the second port is turned on and the third port is turned off;
    turning off the relay device in a case where the first relay device is the relay device; and
    transmitting a command to the first relay device to turn off power in a case where the first relay device is not the relay device.

* * * * *